US009085422B2

(12) United States Patent
Cristoforetti

(10) Patent No.: US 9,085,422 B2
(45) Date of Patent: Jul. 21, 2015

(54) SINGULATOR
(75) Inventor: Giorgio Cristoforetti, Varese (IT)
(73) Assignee: MECHANICA SISTEMI S.R.L., Paderno Dugnano (IT)
(*) Notice: Subject to any disclaimer, the term of this patent is extended or adjusted under 35 U.S.C. 154(b) by 76 days.
(21) Appl. No.: 13/981,294
(22) PCT Filed: Jan. 24, 2012
(86) PCT No.: PCT/IB2012/050323
§ 371 (c)(1), (2), (4) Date: Sep. 13, 2013
(87) PCT Pub. No.: WO2012/101576
PCT Pub. Date: Aug. 2, 2012
(65) Prior Publication Data
US 2014/0001010 A1 Jan. 2, 2014
(30) Foreign Application Priority Data
Jan. 24, 2011 (IT) .............................. MI2011A0069
(51) Int. Cl.
*B65G 17/24* (2006.01)
*B65G 47/28* (2006.01)
(Continued)
(52) U.S. Cl.
CPC .............. *B65G 47/268* (2013.01); *B65G 17/24* (2013.01); *B65G 47/22* (2013.01); *B65G 47/28* (2013.01); *B65G 47/30* (2013.01); *B65G 2201/0264* (2013.01)
(58) Field of Classification Search
CPC ........ B65G 17/24; B65G 47/22; B65G 47/28; B65G 47/268; B65G 13/04; B65G 2201/0264; B65G 47/30
USPC ........ 198/457.02, 457.03, 786, 779, 436, 437
See application file for complete search history.

(56) References Cited
U.S. PATENT DOCUMENTS
1,931,453 A 10/1933 Adams
3,511,357 A 5/1970 Vanderhoof
(Continued)

FOREIGN PATENT DOCUMENTS
DE 10 2008 060105 A1 6/2010
EP 1 122 195 A1 8/2001
(Continued)

OTHER PUBLICATIONS
International Search Report for PCT/IB2012/050323, Jul. 16, 2012 (6 pages).
(Continued)

*Primary Examiner* — Mark A Deuble
(74) *Attorney, Agent, or Firm* — Jones Robb PLLC

(57) ABSTRACT

The invention relates to a singulator, constituted by a converger module (2), a diverger module (10) and a selector module (17) arranged sequentially. The loose articles (5) in inlet to the converger module (2) are converged towards a first central zone (7) by two adjacent roller planes. The articles resting on the central zone (7) are advanced towards a central zone (13) of a diverger module (10) and are then transported towards the outlet station (12) thereof; conversely, the articles arranged laterally with respect to the central zone (13) of the diverger module (10) are laterally distanced by means of two corresponding roller planes having rollers with inclined axes up to striking on two respective lateral walls (42, 43) suitable for moving the articles received restingly towards the outlet station (12). A selector module (17) controlled by a control unit (22) moves the articles arriving on the three advancement lines (A, B, C) in order to bring them to the outlet station (19) of the selector module (17) in a singularized configuration and not superposed along the transversal development of the singulator.

21 Claims, 22 Drawing Sheets

(51) Int. Cl.
  *B65G 47/30* (2006.01)
  *B65G 47/26* (2006.01)
  *B65G 47/22* (2006.01)

(56) References Cited

U.S. PATENT DOCUMENTS

| | | |
|---|---|---|
| 3,580,379 A | 5/1971 | Shuster et al. |
| 3,774,748 A | 11/1973 | Dedere et al. |
| 3,841,461 A | 10/1974 | Henderson et al. |
| 4,019,620 A | 4/1977 | Frenkel et al. |
| 4,039,074 A | 8/1977 | Maxted |
| 4,044,897 A | 8/1977 | Maxted |
| 4,264,002 A | 4/1981 | Van Der Schie |
| 4,466,529 A | 8/1984 | Thrandorf et al. |
| 4,846,336 A | 7/1989 | Hoyland et al. |
| 5,400,896 A | 3/1995 | Loomer |
| 5,410,232 A * | 4/1995 | Lee ............ 318/568.11 |
| 5,415,281 A | 5/1995 | Taylor et al. |
| 5,531,311 A | 7/1996 | LeMay |
| 5,701,989 A | 12/1997 | Boone |
| 5,769,204 A | 6/1998 | Okada et al. |
| 5,782,332 A | 7/1998 | Guidetti et al. |
| 5,918,725 A | 7/1999 | Farina |
| 5,950,800 A | 9/1999 | Terrell et al. |
| 6,131,723 A | 10/2000 | Schroader et al. |
| 6,401,936 B1 | 6/2002 | Isaacs et al. |
| 6,412,621 B1 * | 7/2002 | De Vree et al. ............ 198/347.4 |
| 6,694,220 B1 | 2/2004 | Tanz |
| 7,191,894 B2 * | 3/2007 | Costanzo et al. ........ 198/457.05 |
| 7,896,150 B2 * | 3/2011 | Smalley et al. ............... 198/415 |
| 2001/0032773 A1 | 10/2001 | Pelka |
| 2003/0141165 A1 | 7/2003 | Reznik |
| 2003/0221932 A1 | 12/2003 | Costanzo |
| 2005/0023105 A1 * | 2/2005 | Costanzo et al. ....... 193/35 MD |
| 2007/0221475 A1 | 9/2007 | Halsey et al. |
| 2007/0246328 A1 | 10/2007 | Reznik |
| 2010/0006396 A1 | 1/2010 | Schmid |
| 2010/0038210 A1 | 2/2010 | Cox |

FOREIGN PATENT DOCUMENTS

| | | |
|---|---|---|
| EP | 1 293 432 A1 | 3/2003 |
| EP | 1 502 882 A2 | 2/2005 |
| EP | 1 556 297 B1 | 4/2008 |
| JP | 08-067334 A | 3/1996 |
| JP | 2000-247419 A | 9/2000 |
| JP | 2007-153484 A | 6/2007 |
| JP | 2007-204222 A | 8/2007 |
| WO | WO 00/76887 A1 | 12/2000 |
| WO | WO 2008/124626 A2 | 10/2008 |
| WO | WO 2009/029091 A1 | 3/2009 |
| WO | WO 2009/114439 A2 | 9/2009 |

OTHER PUBLICATIONS

Written Opinion for PCT/IB2012/050323, Jul. 16, 2012 (10 pages).

* cited by examiner

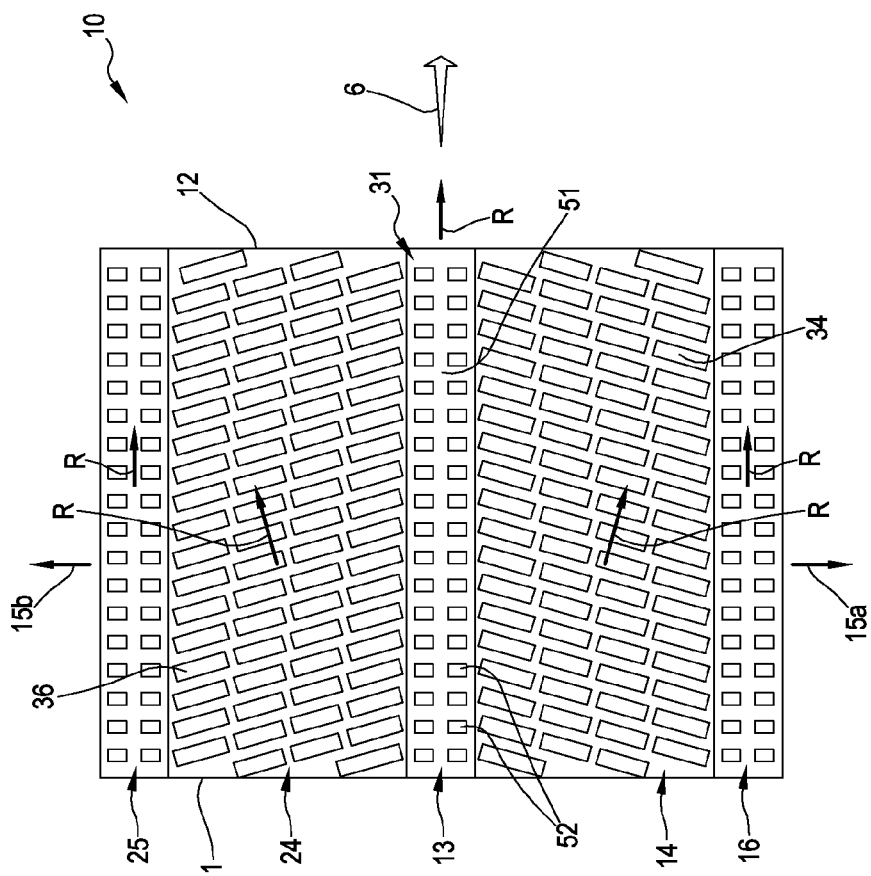
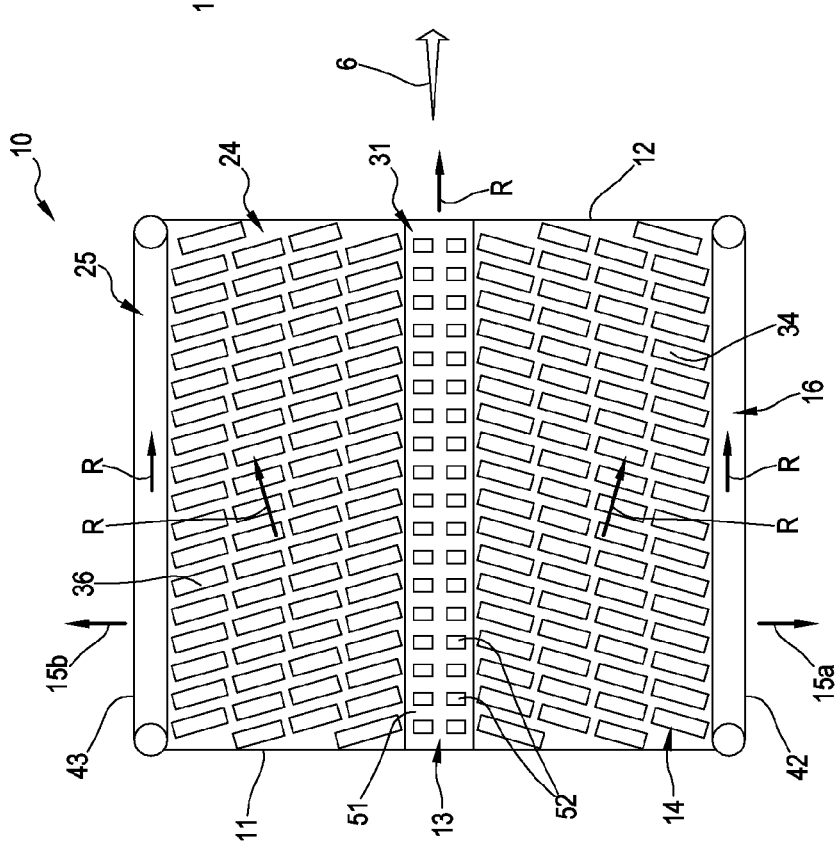
FIG. 15
FIG. 16

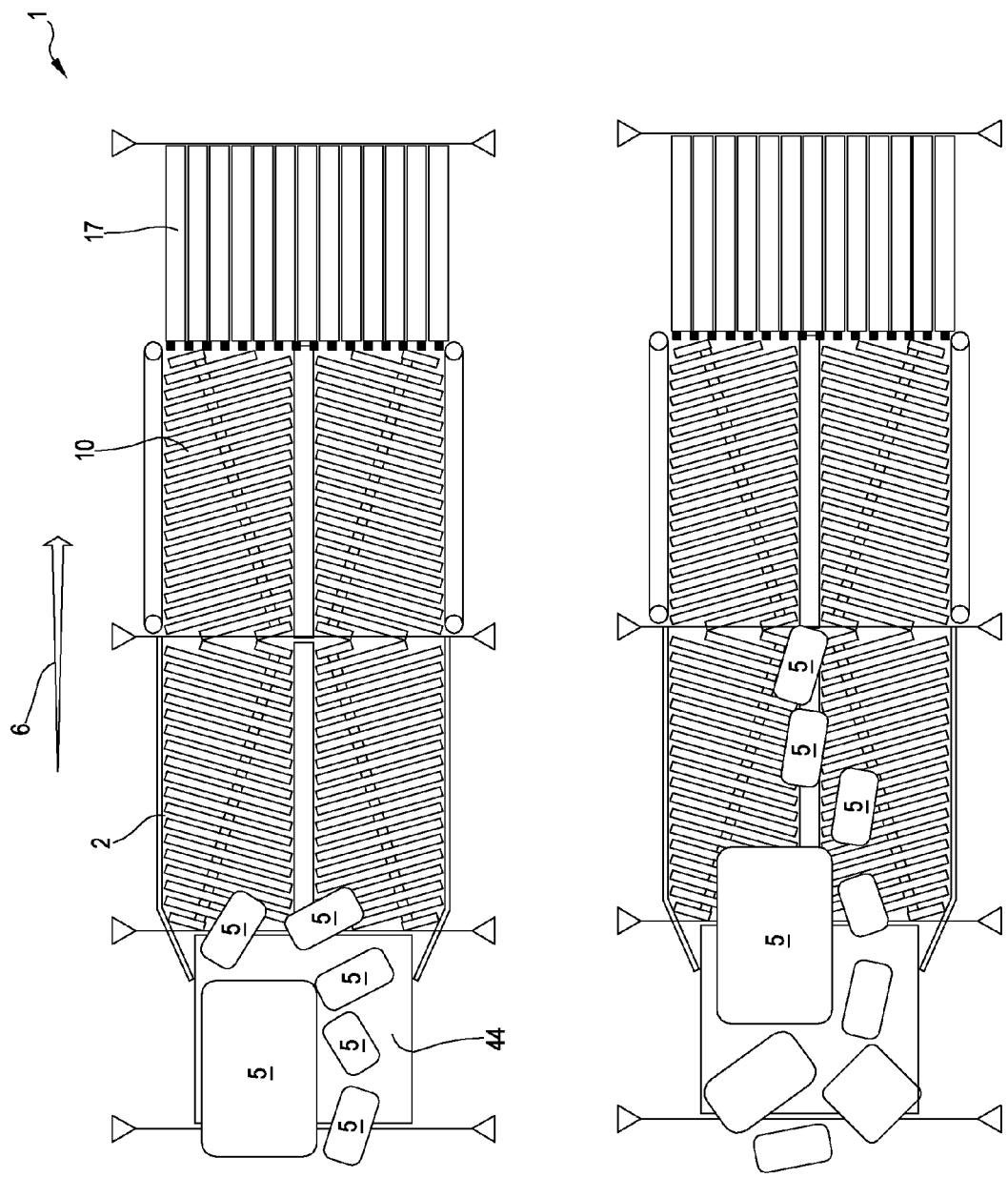

SINGULATOR

This is a national stage application of PCT/IB2012/050323, filed internationally on Jan. 24, 2012, which claims priority to Italian Application No. MI2011A000069, filed on Jan. 24, 2011, the entire contents of which is incorporated by reference herein.

The present invention relates to a singulator. In particular, the equipment described in the following is suitable for receiving a plurality of loose articles in inlet and to provide in outlet the aforementioned plurality of articles, suitably singulated (on one or more lines), i.e. arranged consecutively along predetermined advancement lines.

The main field of application of the singulator of the invention is that of singulating loose articles arranged two-dimensionally, i.e. not superposing on one another.

TECHNOLOGICAL BACKGROUND

As is known, many commercial and industrial activities require a fixed number of articles that are generally fed randomly and are loosely ordered and then automatically sorted so that they can thereafter be handled more easily in an automatic or semi automatic way.

The machines predisposed to this operation are known as "singulators".

The areas of use of the singulator are varied, and are cited by way of non-limiting example to the field of sorting and delivering mail, the dispatching and parcel distribution sector, etc.

There are several equipment on the market today suitable for the performance of the above-mentioned task.

A first type of this machine comprises, in the main structure thereof destined for singulating operations, the use of a first converger station constituted by a central high-friction conveyor belt flanked on both sides by two respective roller planes having inclined axes with respect to the advancement direction of the articles.

The roller planes impart, on the articles resting thereon, an advancement motion and lateral translation towards the high friction central belt bearing the majority of articles on the central belt itself.

A diverger station is located after the converger station, which diverger station is also a high-friction central belt which follows on from the central belt of the converger station and is destined to receive the articles that have been brought to the central zone of the device.

Two roller planes are flanked to the central belt, having rollers with inclined axes destined to impart on the articles entirely resting thereon an advancement motion and a corresponding lateral movement which distance them from the high-friction central belt. In particular, an article that might be at least partially resting on the central belt would be transported thereby and would not be affected by the lateral thrust of the corresponding roller plane; vice versa, a product resting exclusively on the roller plane is distanced from the central belt.

Appropriate conveyor belts or recirculating belts are present at the flanks of the diverger station, which belts are destined to receive the products that have been distanced from the diverging roller planes and return them to the inlet of the machine and in particular to the inlet of the converger station so that they can be newly processed.

Conversely, the singulated products that are on the high friction central belt proceed towards the further process stations.

In this way the products are singulated at the central zone of the machine, while all the articles which, in particular due to being superposed in a transversal direction to the transport direction, should they not reach the central zone, are advantageously recirculated via the diverger station, and via the recirculating belts are returned in inlet to the machine and thus re-processed.

U.S. Pat. No. 5,701,989 describes, with particular reference to FIG. 13, a device similar to the one described above and used in commerce.

The main difference is linked to the absence of a conveyor belt at the convergence zone (in other words there are only two roller planes converging towards the central advancement axis) and to the presence of a diverger station constituted by a plurality of additional conveyor belts with the aim of removing articles that are not singulated in such a way to return them into the singulating cycle.

A second type of known devices suitable for singulating products is constituted by a complex apparatus in which all articles entering the device are suitably scanned by, for example, suitable cameras which can provide the detected information to a control unit which reconstructs the distribution of the articles along the advancement pathway thereof.

In particular, a movement plane is present, constituted by an array of individual conveyor belts, all independently movable.

In other words, the movement plane consists of a fixed number of rows and columns defined by a plurality of individual conveyor belts which are commanded by the control unit via respective motors.

As the control unit has the position of the single articles in its memory, and is monitoring the movements, it commands the conveyor belts with differentiated velocities, such as to be able to suitably orientate the articles by rotating them, and also being able to distance them in the longitudinal direction by differentiating the advancement velocities of the belts on which the articles are resting.

When leaving the plane, the various articles will be orientated in an orderly manner and will be sufficiently spaced along their respective advancement lines.

In this way it is possible to operate downstream of the movement plane of the articles, as they are already pre-ordered, and perform thereon a final singulation.

The above-mentioned machine is at least partially described in some patent publications, for example, in patents EP 1556297 and U.S. 2003/141165.

The singulators briefly described above, while admirably fulfilling the tasks they are designed for, are not free from limitations and/or operational problems.

For example, the singulator involving exhibiting converger station, the diverger station and the recirculating belt is extremely large both longitudinally and transversally.

In fact, the operating principle requires bearing all the products on the central singulating conveyor belt, and leads to the requirement to have determined lengths in the transport direction so as to ensure adequate filling of the high friction central belt.

Further, the need to be able to recircule products that have not been singulated requires the presence of two further recirculating belts positioned at the flanks of the machine, which obviously increases the dimensions of the apparatus in that direction.

The above will generally involve the need to have large volumes/dimensions in order to install the singulators in question, resulting in increases in costs of both construction of the device and the management of the machine itself.

Conversely, as the device exhibits the multiplicity of conveyor belts that are independently movable, it is much more compact, but at the same time, extremely complex in terms of construction and operation management. Indeed, it is necessary to predispose a control unit and cameras to monitor suitable movement of articles, as well as a control algorithm that can enable efficient and individual operation in a controlled manner on each of the conveyor belts.

Further, each of the conveyor belts is fitted with a respective activation and a respective motor, which clearly increase the constructional and maintenance costs, while at the same time reducing the reliability of the singulator (considering the high number of electrical and mechanical parts that make it up).

SUMMARY

In this situation, a main aim of the invention is to make available a singulator which can substantially obviate the drawbacks of the known-type machines.

A first aim of the singulator, described in the following in various embodiments, is to make available a machine that is sufficiently compact and at the same time rather simple from the point of view of management and control.

An objective is to limit the active control functions required for singulating, thus also limiting, the number of motors (and the consequent electronics), as well as the mechanical parts in motion.

Lastly, a further aim is to contain the transversal dimensions of the device, but also the longitudinal dimensions, by providing a singulator able to guarantee good singulating performances in terms of a maximum number of articles to be singulated per unit of time and in terms of reliability of singulation.

These and other aims besides are substantially attained by a singulator according to one or more of the accompanying claims. In an independent first aspect a singulator is described, which comprises: at least a converger module developing between an inlet station and an outlet station, the converger module being configured such as to receive loose articles at the inlet station and to move the articles towards the outlet station along a main advancement direction, the converger module exhibiting at least a first zone defined between the inlet station and the outlet station along the main advancement direction and configured such as alternatively to impart on the articles resting thereon an advancement motion along the main advancement direction or an advancement motion along the main direction and a lateral movement in a direction of an adjacent second zone, at least a second zone flanked to the first zone along the main advancement direction and developing between the inlet and the outlet station, the second zone being configured such as to impart on the articles resting thereon an advancement motion along the main direction and a lateral movement in a direction of the first zone, at least a diverger module located downstream of the converger module along the main advancement direction developing between a respective inlet station and an outlet station, the diverger module exhibiting: a first zone configured such as to receive articles in arrival from the first zone of the converger module and such as to impart on the articles resting thereon an advancement motion along the main advancement direction; a second zone flanked to the first zone along the advancement direction and developing between the inlet station and the outlet station, said second zone being configured such as to impart on the articles resting thereon an advancement motion along the main direction and a lateral movement in a distancing direction from the first zone; at least a third zone, flanking the second zone along the main advancement direction on the opposite side with respect to the first zone and developing from an initial position comprised between the inlet station and a halfway zone up to the outlet station, the articles at the third zone being moved along the advancement direction up to the outlet station; a fourth zone developing between an inlet station and an outlet station and flanked to the first zone along the main advancement direction on an opposite side to the second zone, the fourth zone being configured such as to impart on the articles resting thereon an advancement motion along the main advancement direction and a lateral movement in a distancing direction from the first zone, in particular the lateral movement imparted by the second zone and the fourth zone having a same direction but opposite sense directed respectively in a distancing direction from the zone; and a fifth zone flanking the fourth zone along the main advancement direction on an opposite side to the first zone, the articles at said fifth zone being moved along the advancement direction up to the outlet station.

In a further independent aspect, a singulator is provided comprising: at least a converger module developing between an inlet station and an outlet station, the converger module being configured such as to receive loose articles at the inlet station and to move the articles towards the outlet station along a main advancement direction, the converger module exhibiting at least a first zone defined between the inlet station and the outlet station along the main advancement direction and configured such as alternatively to impart on the articles resting thereon an advancement motion along the main advancement direction or an advancement motion along the main advancement direction and a lateral movement in a direction of an adjacent second zone, at least a second zone flanked to the first zone along the main advancement direction and developing between the inlet and the outlet station, the second zone being configured such as to impart on the articles resting thereon an advancement motion along the main direction and a lateral movement in a direction of the first zone; at least a diverger module located downstream of the converger module along the main advancement direction developing between a respective inlet station and an outlet station, the diverger module exhibiting: a first zone configured such as to receive articles in arrival from the first zone of the converger module and such as to impart on the articles resting thereon an advancement motion along the main advancement direction; a second zone flanked to the first zone along the advancement direction and developing between the inlet station and the outlet station, said second zone being configured such as to impart on the articles resting thereon an advancement motion along the main direction and a lateral movement in a distancing direction from the first zone; at least a third zone, flanking the second zone along the main advancement direction on the opposite side with respect to the first zone and developing from an initial position comprised between the inlet station and a halfway zone up to the outlet station, the articles at said third zone being moved along the advancement direction up to the outlet station; at least a selector module located downstream of the diverger module along the main advancement direction and developing between a respective inlet station and an outlet station, the selector module exhibiting a first zone configured such as to receive the articles moved by at least the first zone of the diverger module such as to impart, on the articles resting thereon, an advancement motion along the main advancement direction from the inlet station to the outlet station and exhibiting a second zone configured such as to receive the articles moved by the third zone of the diverger module and such as to impart on the articles resting thereon an advancement motion along the main advancement direction from the inlet station to the outlet station; a control unit active at least on the first zone of the selector module such as to impart an advancement motion along the main advancement direction with a first profile of velocity and active on at least the second zone of the selector module such as to impart an advancement motion along the main advancement direction with a second profile of velocity which is independent of the first profile of velocity.

In a third aspect, a singulator is provided according to any one of the preceding aspects, wherein the converger module comprises a third zone flanked to the first zone along the main advancement direction on an opposite side to the second zone and developing between the inlet station and the outlet station, the third zone being configured such as to impart, on the articles resting thereon, an advancement motion along the main direction and a lateral movement in the direction of the first zone, in particular the lateral movement, from the third zone and the second zone towards the first zone having a same direction and an opposite sense respectively directed towards the first zone.

In a fourth aspect a singulator is provided according to any one of the preceding aspects, further comprising: at least a selector module located downstream of the diverger module along the main advancement direction and developing between a respective inlet station and an outlet station, the selector module exhibiting a first zone configured such as to receive the articles moved by at least the first zone of the diverger module such as to impart, on the articles resting thereon, an advancement motion along the main advancement direction from the inlet station to the outlet station and exhibiting a second zone configured such as to receive the articles moved by the third zone of the diverger module and such as to impart on the articles resting thereon an advancement motion along the main advancement direction from the inlet station to the outlet station; a control unit active at least on the first zone of the selector module such as to impart an advancement motion along the main advancement direction with a first profile of velocity and active on at least the second zone of the selector module such as to impart an advancement motion along the main advancement direction with a second profile of velocity which is independent of the first profile of velocity.

In a fifth aspect a singulator is provided according to any one of the preceding aspects wherein the selector module comprises a third zone configured such as to receive the articles moved by the fifth zone of the diverger module and to impart on the objects resting thereon an advancement motion along the main advancement direction from the inlet station to the outlet station, the control unit being active on the third zone of the selector module such as to impart an advancement motion along the main advancement direction with a third profile of velocity independent of the first profile of velocity and/or the second profile of velocity.

In a sixth aspect, a singulator is provided according to any one of the preceding aspects, comprising a detector system interlocked to the control unit such as to detect, over time, passage of articles in inlet to the selector module at least at the first and the second zone and in particular also at the third zone, the control unit determining the profiles of velocity of the respective zones according to the detected data received by the detector system, in particular the profiles of velocity being set such as to obtain outlet of the articles from the outlet station in a singulated and not overlapping configuration along a transversal development of the selector module, for example a development which is perpendicular to the main advancement direction.

In a seventh aspect, a singulator is provided according to any one of the preceding aspects, wherein the selector module comprises a fourth zone flanked to and interposed between the first and the second zone in the main advancement direction and a fifth zone flanked to and interposed between the first and the third zone along the main advancement direction, said fourth and fifth zone developing from the inlet station to the outlet station, in particular the fourth and fifth zone comprising moved surfaces having a coefficient of friction which is lower than a coefficient of friction of the respective adjacent zones.

In an eighth aspect, a singulator is provided according to any one of the preceding aspects, wherein said first zone of the converger module comprises a movement organ, for example a conveyor belt having a high coefficient of friction, the coefficient of friction of the movement organ of the first zone being greater than the coefficient of friction of the second zone and in particular being greater than the coefficient of friction of the third zone.

In a ninth aspect, a singulator is provided according to any one of the preceding aspects, wherein said first zone of the diverger module comprises a movement organ, in particular a conveyor belt having a high coefficient of friction, the coefficient of friction of the movement organ of the first zone being greater than the coefficient of friction of the second zone and in particular being greater than the coefficient of friction of the fourth zone.

In a tenth aspect, a singulator is provided according to any one of the preceding aspects, wherein said first zone of the converger module comprises at least a movement element, in particular a roller plane having rollers with an inclined axis with respect to the main advancement direction, configured such as to impart on the articles resting thereon an advancement motion along the main advancement direction and a lateral movement in a direction of the second zone.

In an eleventh aspect, a singulator is provided according to any one of the preceding aspects, wherein said second zone of the converger module comprises a movement organ, in particular a roller plane exhibiting rollers having an inclined axis with respect to the main advancement direction, such as to impart the advancement motion towards the outlet station and the lateral movement towards the first zone, in particular the third zone of the converger module comprising a movement element, in particular a roller plane exhibiting rollers having an inclined axis with respect to the main advancement direction, such as to impart an advancement motion towards the outlet station and the lateral movement towards the first zone.

In a twelfth aspect, a singulator is provided according to any one of the preceding aspects, wherein said second zone of the diverger module comprises a movement element, in particular a roller plane having rollers with an inclined axis with respect to the main advancement direction, configured such as to impart the advancement motion towards the outlet station and the lateral movement in a distancing direction from the first zone, in particular the fourth zone of the diverger module comprising a movement element, in particular a roller plane having rollers with an inclined axis with respect to the main advancement direction, configured such as to impart the advancement motion towards the outlet station and the lateral movement in a distancing direction from the first zone.

In a thirteenth aspect, a singulator is provided according to any one of the preceding aspects, wherein the third zone of the diverger module comprises a lateral wall emerging from a median plane of the second zone, said lateral wall being configured such as to restingly receive the articles pushed by the second zone in a distancing direction from the first zone, and being configured such as to enable movement along the main advancement direction towards the outlet station, in particular the fifth zone of the diverger module comprising a lateral wall emerging from a median plane of the fourth zone, said lateral wall being configured such as to restingly receive the articles pushed by the fourth zone in a distancing direction from the first zone, and being configured such as to enable a movement along the main advancement direction towards the outlet station (12).

In an independent further (fourteenth) aspect, which can also be in combination with one or more of the preceding aspects, a singulator is provided, comprising: a predetermined number of processing modules of articles developing between an inlet station and an outlet station and configured such as to receive loose articles at the inlet station and to process and move the articles towards the outlet station along a main advancement direction, the predetermined number of processing modules of articles being configured such as to bring the articles in outlet from the outlet station according to at least a first and a second predetermined advancement lines; a selector module located downstream of the predetermined number of modules along the main advancement direction and developing between a respective inlet station and an outlet station, the selector module exhibiting a first zone configured such as to receive the articles arriving from the first advancement line and for imparting on the articles resting thereon an advancement motion along the main advancement direction from the inlet station to the outlet station and exhibiting a second zone configured such as to receive the articles coming from the second advancement line and for imparting on the articles resting thereon an advancement motion along the main advancement direction from the inlet station to the outlet station, each of said first and second advancement zones comprising a respective transport device, characterised in that at least one of said first and second transport devices exhibits at least a first transport surface developing between the inlet station and the outlet station and a second transport surface developing between the inlet station and the outlet station and positioned adjacent to the first transport surface, said first transport surface exhibiting a coefficient of friction that is greater than the coefficient of friction of the second transport surface.

In a fifteenth aspect, a singulator according to the preceding aspect is provided, wherein the other of said first and second transport devices exhibits at least a first transport surface developing between the inlet station and the outlet station and a second transport surface developing between the inlet station and the outlet station and positioned adjacent to the first transport surface, said first transport surface exhibiting a coefficient of friction that is greater than the coefficient of friction of the second transport surface.

In a sixteenth aspect a singulator according to anyone of aspects 14 and 15 is provided, wherein at least one of said first and second transport devices further comprises a third transport surface developing between the inlet station and the outlet station, in particular the first transport surface being adjacent to the second and the third transport surface, i.e. being interposed there-between, optionally the first transport surface exhibiting a width in a perpendicular direction to the main advancement direction which is greater than the width of said second and/or third transport surface.

In a seventeenth aspect, a singulator according to any one of the preceding aspects from 14 to 16 is provided, wherein the first and the second and optionally the third transport surface of the first transport device are moved by a same first movement system both exhibiting a same advancement velocity from the inlet station to the outlet station.

In an eighteenth aspect, a singulator according to any one of the preceding aspects from 14 to 17 is provided, wherein the first transport device comprises at least a first and a second conveyor belt and optionally a third conveyor belt, the first and the second transport surface and optionally the third transport surface being defined by the active surfaces respectively of the first and the second conveyor belt and optionally of the third conveyor belt, in particular said conveyor belts being distinct and separate from one another.

In a nineteenth aspect a singulator is provided according to any one of the preceding aspects from 14 to 18, wherein the first and the second transport surface of the second transport device are moved by a same second movement system both exhibiting a same advancement velocity from the inlet station to the outlet station, in particular the advancement velocity of the first and second transport surface of the second conveyor device being independent of the advancement velocity of the first and the second transport surface of the first conveyor device.

In a twentieth aspect, a singulator is provided according to any one of the preceding aspects from 15 to 19, wherein the low-friction second transport surface of the second conveyor device is flanked and adjacent to the low-friction second surface of the first conveyor device.

In a twenty-first aspect, a singulator is provided according to any one of the preceding aspects from 14 to 20, wherein the second conveyor device comprises at least a first and a second conveyor belt, the first and the second transport surfaces being defined by the active surfaces respectively of the first and the second conveyor belt, in particular said conveyor belts being distinct and separate from one another.

In a twenty-second aspect, a singulator is provided according to any one of preceding aspects from 14 to 21, wherein the predetermined number of processing modules is configured such as to bring the articles in outlet from the outlet station according to at least three distinct predefined advancement lines, the selector module comprising a third zone configured such as to receive the articles in arrival from the third advancement line and to impart on the articles resting thereon an advancement motion along the main direction of the inlet station to the outlet station, the third advancement zone comprises a third transport device exhibiting at least a first transport surface developing between the inlet station and the outlet station and a second transport surface developing between the inlet station and the outlet station and positioned adjacent to the first transport surface, said first transport surface exhibiting a coefficient of friction that is greater than the coefficient of friction of the second transport surface.

In a twenty-third aspect, a singulator is provided according to any one of preceding aspects from 14 to 22, wherein the first and the second transport surface of the third transport device are moved by a third movement system both exhibiting a same advancement velocity from the inlet station to the outlet station, in particular the advancement velocity of the first and second transport surfaces of the first transport device being independent of the advancement velocity of the first and second surface of the first transport device and/or of the second transport device.

In a twenty-fourth aspect, a singulator is provided according to any one of preceding aspects 22 or 23, wherein the third transport device comprises at least a first and a second conveyor belt, the first and the second transport surface being defined by the active surfaces respectively of the first and the second conveyor belt, in particular said conveyor belts being distinct and separate from one another.

In a twenty-fifth aspect, a singulator is provided according to any one of preceding aspects 22 or 23 or 24, wherein the low-friction second transport surface of the third transport device is flanked and adjacent to the low-friction third transport surface of the first transport device.

In a twenty-sixth aspect a singulator is provided according to any one of preceding aspects 18, 20 or 24, wherein the movement system comprises a motor, in particular electrical, and a transmission suitable for carrying the motion generated by the motor to at least a first movement shaft, the first and the second transport surfaces being moved by said shaft such as to generate an advancement motion on the articles resting thereon from the inlet station to the outlet station.

In a further independent aspect, a process for singulating the loose articles is provided, comprising following steps: supplying, with loose articles, a converger module of a singulator, the converger module developing between an inlet station and an outlet station and being configured such as to receive loose articles at the inlet station and to move them towards the outlet station along a main advancement direction, the converger module exhibiting at least a first zone defined between the inlet station and the outlet station along the main advancement direction and configured such as alternatively to impart on the articles resting thereon an advancement motion along the main advancement direction or an advancement motion along the main advancement direction and a lateral movement in a direction of an adjacent second zone, and at least a second zone flanked to the first zone along the main advancement direction and developing between the inlet station and the outlet station along the main advancement direction and being configured such as to impart on the articles resting thereon an advancement motion along the main direction and a lateral movement in a direction of the first zone; moving the articles resting to the first zone along the main advancement direction, or moving the articles resting on the first zone along the main advancement direction and along the lateral direction in the direction of the first zone; moving the articles resting on the second zone along the main advancement direction and along a lateral movement direction in the direction of the first zone; sending the articles in outlet from the converger module to a diverger module, the diverger module exhibiting a first zone configured such as to receive the articles in arrival from the first zone of the converger module and imparting on the articles resting thereon an advancement motion along the main advancement direction, a second zone, flanked to the first zone along the advancement zone configured such as to impart on the articles resting thereon an advancement motion along the main direction and a lateral movement distancing from the first zone, at least a third zone flanked to the second zone along the main advancement direction on an opposite side to the first zone, the articles at the third zone being moved along the advancement direction up to the outlet station; moving the articles resting on the first zone of the diverger module along the advancement direction; moving the articles resting on the second zone of the diverger module along the main direction and along a lateral motion distancingly from the first zone; moving the articles resting on the third zone of the diverger module along the main advancement direction up to the outlet station; sending the articles in outlet from the diverger module to a selector module comprising a first zone configured such as to receive the articles in arrival from the first zone of the diverger module and for imparting on the articles resting thereon an advancement motion along the main advancement direction from the inlet station to the outlet station and a second zone configured such as to receive the articles in arrival from the third zone of the diverger module such as to impart on the articles resting thereon an advancement motion along the main advancement direction from the inlet station to the outlet station; moving, by a command from a control unit, the articles resting in the first zone of the selector module along the main advancement direction with a first velocity profile; moving, by means of a command by a control unit, the articles resting in the second zone of the selector module from the inlet station to the outlet station with a second velocity profile that is different from the first velocity profile.

Further characteristics and advantages will more fully emerge from the detailed description of various embodiments of a singulator, of novel conception, according to the invention.

BRIEF DESCRIPTION OF THE DRAWINGS

The description will be carried out in the following with reference to the accompanying schematic drawings provided exclusively by way of non-limiting example, in which:

FIGS. 13-16 illustrate four possible variants of the diverger module;

Figures 1, 2:
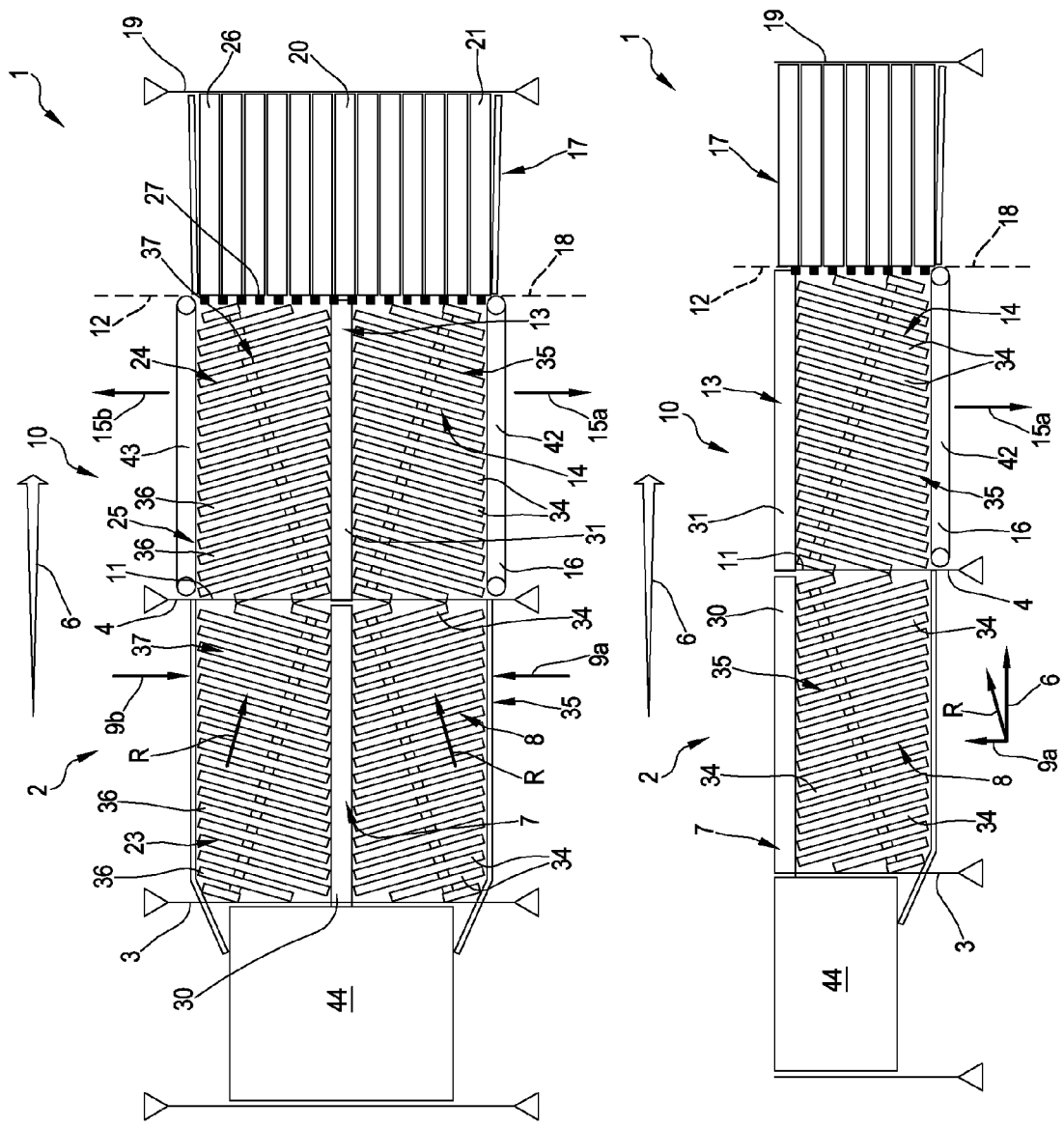
FIG. 1 illustrates a first embodiment of a singulator described in the following.
FIG. 2 illustrates a variant of the singulator of FIG. 1.

With reference to the FIG. 1 denotes in its entirety a singulator as described below.

In particular, and as previously mentioned, the singulator object of the following description is particularly intended for the singulation of items arranged loosely in a plane, i.e. not overlapping or partially overlapping each other (in technical jargon a 2-D singulator of loose products).

In particular, the articles 5, which may have undergone further manipulation if necessary before reaching the inlet to the singulator (e.g. unstacking operations for providing them in a two-dimensional configuration in inlet) are brought to the inlet of the singulator by a suitable conveyor belt (or equivalent system) for inlet to the main modules of the singulator.

In particular, the products initially reach an inlet station 3 of a converger module 2.

The converger module 2 extends longitudinally along a main advancement direction 6 of articles from the above-mentioned inlet station 3 and an outlet station 4.

In general, the loose articles 5 in inlet to the converger module 2 will be transported (and appropriately handled) starting from the inlet station along the main advancement direction up until reaching the outlet station, to be received by successive modules of the singulator.

Observing in particular the figures and the various embodiments, it can be seen that, in general terms, the converger module 2 primarily exhibits at least a first zone 7 defined between the inlet station 3 and the outlet station 4 along the main advancement or transport direction of the articles 6.

This zone 7 will generally, in a view from above, have a rectangular extension profile, with a main development geometry that is substantially parallel to the main development direction 6, and with the two opposite shorter sides located at inlet and outlet stations 3 and 4.

This zone 7 will be generally configured such as to impart on the articles resting thereon a direct advancement motion exclusively along the main advancement direction 6 (see for example FIG. 1). In other words, the first zone 7 will include at least one movement organ configured such as to impart the movement to the articles.

Alternatively (see FIG. 3) the first zone 7 (i.e. the corresponding movement organ) may be configured such as to impart on the articles 5 resting thereon not only an advancement motion along the main direction 6, but also a lateral movement 9b in the perpendicular direction of the advancement direction directed towards a second zone 8. In other words, the movement organ will be able to impart a parallel motion to the articles or, in an alternative embodiment, a directionally inclined direction (resultant R in the figures) compared to the main advancement direction 6 (or the axis of the main axis of development of the singulator).

Once more from the general point of view, the converger module 2 further exhibits a second zone 8 which is flanked to the first zone 7 along the main advancement direction 6 and also develops between the inlet station 3 and the outlet station 4 of the module 2.

The second zone 8 is configured such as to impart on the articles 5 resting thereon an advancement motion along the main direction 6 and also a lateral movement 9a in the direction of the first zone 7.

In this regard, the second zone 8 will include at least one movement organ (and in general a plurality thereof) configured such as to impart the described movement on the articles (inclined; resultant R).

This second zone 8, in a view from above, also has a rectangular profile with a main development directed parallel to the main advancement direction 6, and with the shorter opposite sides positioned at the inlet stations 3 and the outlet station 4.

In particular, the two corresponding longer sides of the first and second zones 7 and 8, are facing and flanked to one another. In the majority of the illustrated embodiments (except for FIGS. 2 and 3) the converger module 2 also includes a third zone 23 flanked to the first zone 7 along the main advancement direction 6 and positioned opposite the second zone 8.

In general, the first zone 7 will therefore be interposed to the second zone 8 and the third zone 23, the three zones 23, 7, 8 will be adjacent (in particular in contact) and parallel to one another along the advancement direction of the articles as shown in FIG. 1 for example.

The third zone 23 also develops between the inlet station 3 and the outlet station 4 and exhibits, in a view from above, a substantially rectangular extension with the longer sides directed along the main advancement direction 6 and shorter sides that are opposite and positioned at the inlet and outlet stations 3 and 4.

The third zone 23 is configured such as to impart on the articles 5 resting thereon an advancement motion along the main direction 6 and also a lateral movement 9b in the direction of the first zone 7; in particular the lateral movements 9a, 9b imparted respectively from the second zone 8 and the third zone 23 have the same direction (perpendicular to the main direction 6) and opposite senses respectively directed towards the first zone 7. In still other terms, the second 8 and the third zone 23 impart, on the articles resting thereon, not only an advancement motion towards the outlet station 4, but also a lateral movement when moving the articles towards the first central area 7; the resultant force on the articles is denoted by R.

From the point of view of realization, the first zone 7 will include a corresponding movement organ 30 which can, by way of example, be defined by a conveyor belt as shown in FIGS. 1 and 2.

This conveyor belt is generally more limited in transversal dimensions in comparison to the transversal dimensions and relative movement organs of the second and third zones 8, 23 of the converger module 2.

FIG. 1 (and the following figures) shows a single conveyor belt that runs along the whole converger module 2 from the inlet station 3 to the outlet station 4.

Obviously two or more belts may be present, having longitudinal dimensions that are more modest, consecutively arranged and aligned to one another.

Figure 4:
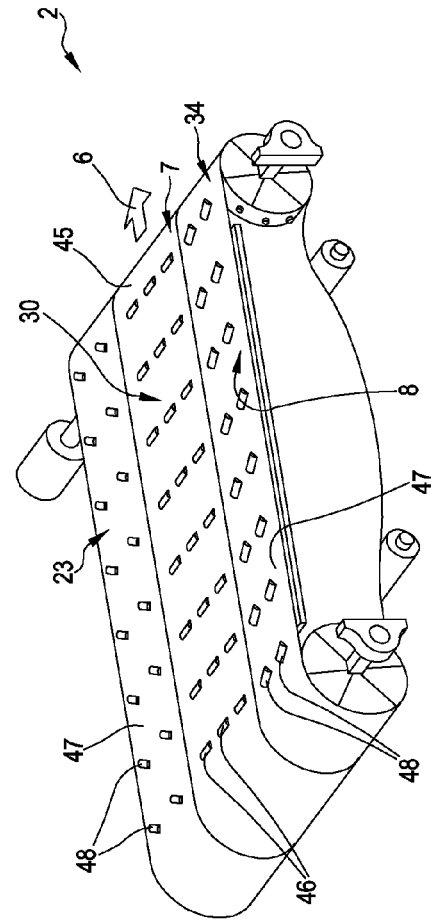
FIG. 4 illustrates a possible variant of the converger module.
Figure 5:
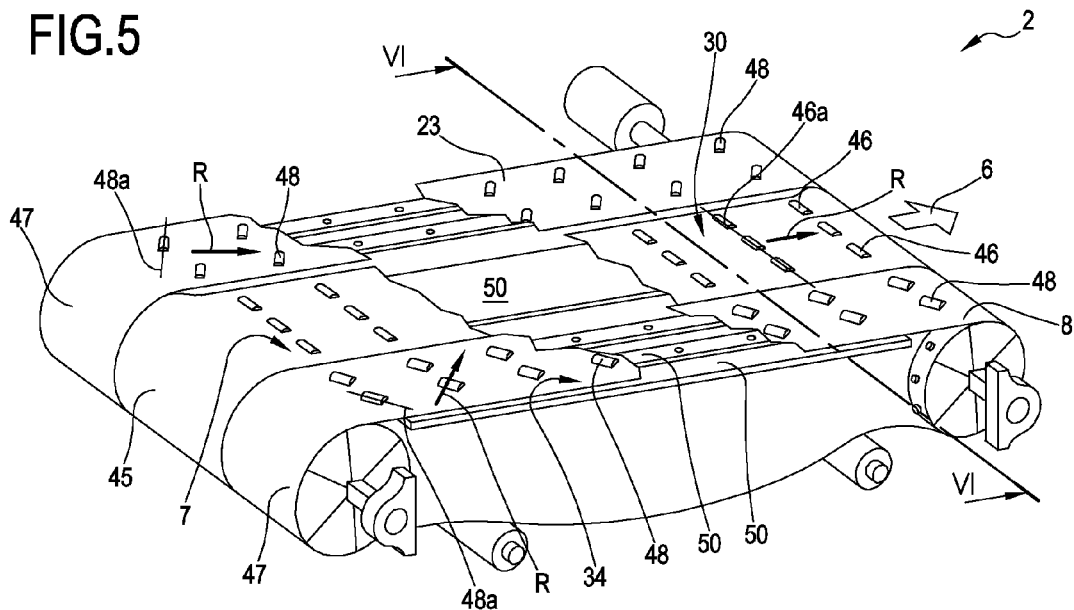
FIG. 5 illustrates a possible further variant of the converger module.

In a further variant, illustrated for example in FIGS. 4 and 5, the movement organ 30 may be constituted by a suitable belt 45 which bears a plurality of free rollers 46 rotating about the axis 46a thereof and which are appropriately positioned in respective cavities of the belt.

In other terms, the belt 45 is then advanced along the indicated direction and the respective rollers 46 borne by the belt 45 will impart on the articles 5 resting thereon a movement that depends on the orientation of the rollers.

In particular, as shown in FIG. 5, the rollers 46 in the first zone 7 will be orientated in such a way as to impart only a movement R directed along the main advancement direction 6 towards the outlet station 4.

With reference to the second zone 8 of the converger module 2, it can be seen that the second zone 8 includes at least a transport element 34 and in general a plurality of transport elements for defining substantially a roller plane 35 with inclined axes rollers with respect to the main advancement direction 6, with the aim of imparting the advancement motion towards the station exit 4, and also the lateral movement 9a towards the first zone 7 (resultant R).

The figures show rollers orientated substantially in the same direction, with axes thereof parallel to each other and also equidistant.

However, note that the above configuration is evidenced and illustrated merely by way of example, as variously equidistanced rollers might be used, inclined respectively in a more or less accentuated way with respect to the main advancement direction 6. The geometry of these rollers, generally cylindrical, can also be varied so as to vary the thrust forces on the articles 5.

Purely by way of example, a truncoconical shape could also be used for the geometry of the lateral surface of the rollers. The third zone 23 of the converger module 2 also includes at least a respective movement element 36 and in general a plurality of the elements 36 suitable for defining a respective roller plane 37 with rollers having an inclined axis with respect to the main advancement direction able to impart the advancement motion towards the outlet station 4 and also the lateral movement 9b towards the first zone 7 of the module (resultant R).

In other words, the two roller planes 35, 37, which will have the same transversal and longitudinal dimensions, are suitable for restingly receiving the articles 5 and directing them towards the conveyor belt or central movement organ 30.

In this case too, an alternative embodiment of the roller planes 35, 37 is illustrated in FIGS. 4 and 5.

As with the first zone 7, each of the two lateral zones 8, 23 may be formed by a respective conveyor belt 47 affording the appropriate seatings within which a plurality of rollers 48 are mounted.

As previously mentioned the axis of inclination 48a of the rollers will be destined to define the forces applied on the articles placed on them.

In particular, by appropriately tilting the axis of rotation with respect to the advancement direction of the support belts 47 the articles 5 can be directed such that displacements are imparted thereon along the main advancement direction 6 and also along a perpendicular direction thereto, such that they are directed, with a lateral movement 9a, 9b, towards the first zone 7 of the converger module (resultant R).

Figure 11:
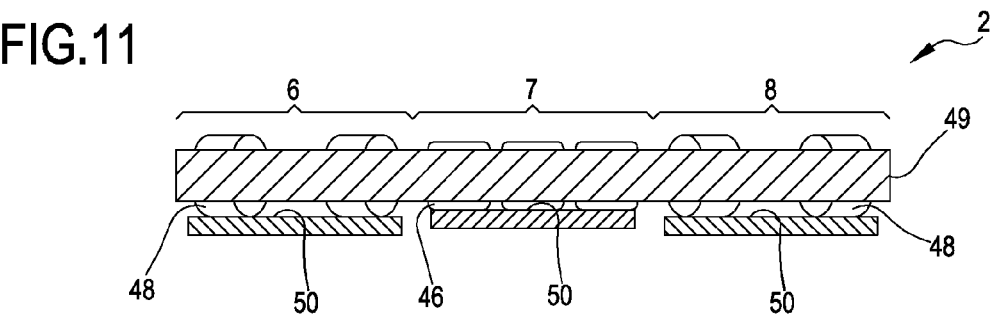
Figure 12:
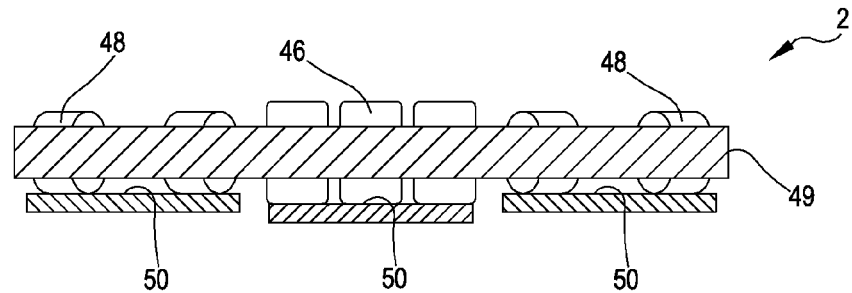

Note also that the conveyor belts 45, 47 supporting the rollers 46, 48 may be separate and distinct (FIG. 5) or even a single belt 49 (FIGS. 11 and 12) in which the various movements are imparted exclusively by mounting the idle rollers 46, 48 and directing the axes 46a, 48a as deemed apt.

Note also that the motion of the rollers can be imparted in accordance with various embodiments, for example by making them rotate (thanks to the motion of the belts they are mounted on) on surfaces 50 suitable for generating the rotation of the rollers due to the friction that is created.

In a possible configuration that has certain advantages, the first zone 7 can be placed at a lower average level $L_1$, equal to or greater than $L_2$, $L_3$, of the corresponding second zone 8 and/or the corresponding third zone 23 of the converger module 2.

Figure 6:
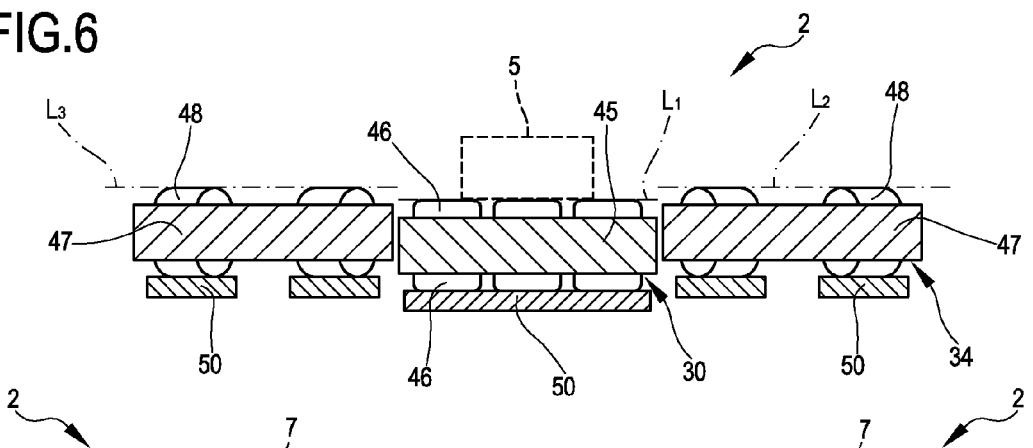
FIG. 6 shows a transversal section of the converger module of FIG. 5.

In particular, FIG. 6 illustrates a situation in which the first zone 7 is at a level $L_1$ that is lower than the second zone 8 and the third zone 23.

Figure 7:
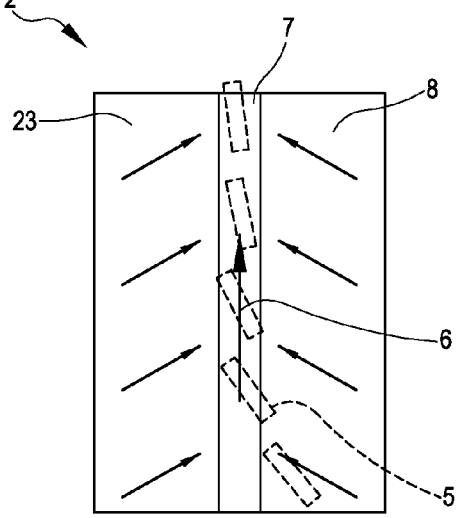
FIGS. 7 and 8 are schematic representations of the different behaviour of the module of FIGS. 4 and 5.
Figure 8:
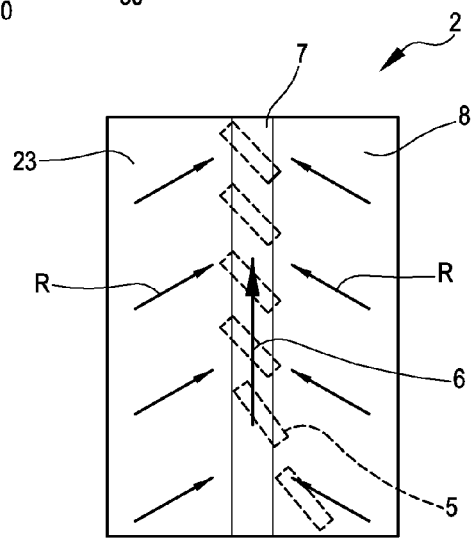

The difference in effects with respect to planar zones is shown in FIGS. 7 and 8 which shows that the presence of a lowered central zone 7 enables articles 5 of small transversal dimensions to be suitably received and directed along the advancement direction 6 without any need for further intervention on the part of the device.

Figure 9:
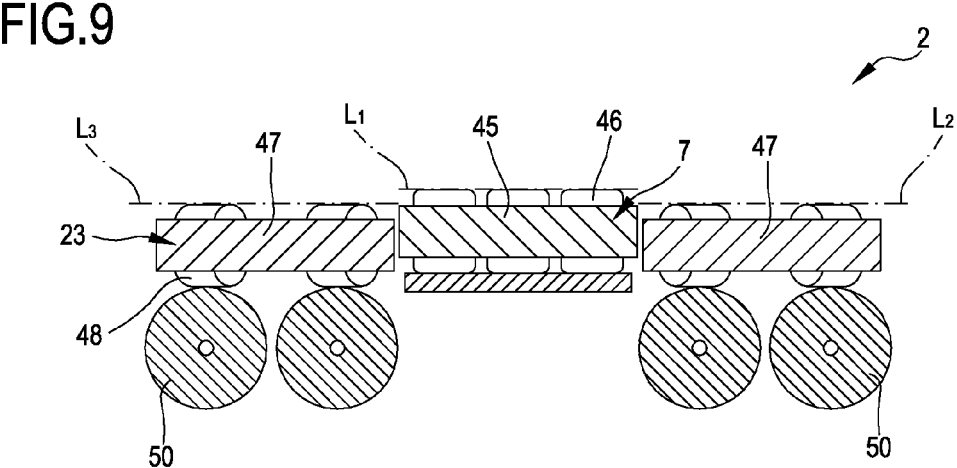
FIGS. 9, 11 and 12 are sections of three different embodiments of the converger module.

FIG. 9 shows the opposite situation where the first zone 7 has a mean lie plane $L_1$ (rest surface of the articles) that is greater than the mean plane $L_2$, $L_3$ defined by the second zone 8 and/or the third zone 23.

Figure 10:
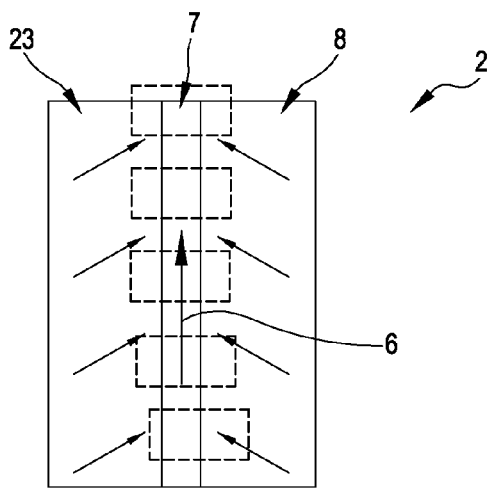
FIG. 10 schematically represents the functioning of a module according to FIG. 9.

In this case the effect is illustrated in FIG. 10 where it can be observed that in the presence of articles having transversal dimensions larger than the first zone 7, the positioning thereof is improved.

Note, however, (FIGS. 11 and 12) that the different heights of the first zone 7 with respect to adjacent zones 8, 23 can be obtained using the conveyor belt 49 and by varying the heights of the individual rollers 46, 48 constrained to the belt.

Obviously, the above-described effects can also be obtained with the roller planes and the conveyor belt, by appropriately selecting the respective rest/lie planes.

Alternatively, roller planes having perpendicular axes to the direction 6 can alternatively be used in the second and third zone 8, 23, which are however inclined with respect to the horizontal plane towards the first zone 7 such that gravity defines the thrust component towards the first zone 7, while the roller planes direct the articles exclusively towards the outlet station 4.

A diverger module 10 is positioned following the converger module 2.

The accompanying figures represent the two modules 2, 10 consecutively arranged and immediately adjacent, i.e. without gaps or spaces between them.

However, note that the presence of intermediate transfer modules is still possible, which do not influence the successive behaviours and operations of the diverger module.

In any event, the articles 5 handled by the converger module 2 are sent in inlet to the diverger module 10 at a respective inlet station 11.

The diverger module 10, in general terms, also has a first zone 13 configured such as to receive the articles from the first zone 7 of the converger module 2 and to impart on the articles resting thereon an advancement motion along the main advancement direction 6.

In this case too, the first zone 13 of the diverger module 10 has a rectangular shape when viewed from above, with the two longer sides parallel to the main advancement direction 6 and the opposite shorter sides positioned at the inlet and outlet stations 11 and 12.

The first zone 13 of the diverger module will also be destined solely to impart the motion along the main advancement direction 6 from the inlet station 11 to the outlet station 12.

The first zone 13 is generally defined by a respective movement organ 31, such as a conveyor belt, which can have and assume the same configurations as the conveyor belt 30 previously belonging to the converger module 2.

In particular it can be alternatively constituted by a plurality of conveyor belts arranged in series along the advancement direction, or even be constituted, in an alternative embodiment, by the belt 51 exhibiting rollers 52 mounted idle and destined to impart the force R and provide an advancement direction of the articles resting thereon.

Note that in general, although not necessarily, both the movement organ 30 of the converger module and the movement organ 31 of the diverger module will present a corresponding high coefficient of friction, generally higher than the respective coefficient of friction of the adjacent areas of the converger module and diverger module.

In this way it is ensured that an article 5, partially resting on the first zone 7 of the converger module 2 or the first zone 13 of the diverger module 10, will mainly receive the motion imparted by the zone and will therefore be exclusively directed along the main advancement direction 6.

Again from the general point of view, the diverger module 10 comprises a second zone 14 flanking the first zone 13 along the advancement direction 6.

The second zone 14 extends between the inlet station 11 and the outlet station 12 and is defined, in plan view, by a rectangular shape with main development sides arranged parallel to the main advancement direction 6 and opposite shorter sides located on opposite sides of the inlet station 11 and the outlet station 12. The second zone 14 is configured such as to impart, on the articles resting thereon, an advancement motion along the main direction 6 and a lateral movement 15a distancing from the first zone 13 (resultant R).

Correspondingly a third area 16 is defined, flanked to the second zone 14 along the main advancement direction 6 opposite the first zone 13.

In still other terms, the second zone 14 of the diverger module 10 is interposed and contiguous to the first zone 13 and the third zone 16, as shown in the accompanying figures of the drawings.

The third zone 16 is configured so that articles positioned thereat are moved only along the advancement direction 6 until they reach the outlet station 12.

The third zone 16 could begin at any point between the inlet station 11 and the median line of the outlet station 12 as the converger module 2 will bring the articles to the centre of the singulator.

Note also that the diverger module 10 shown in FIG. 1 also has a fourth zone 24 developing between the inlet zone 11 and the outlet station 12 flanked to the first zone 13 along the main advancement direction 6 on an opposite side to the second zone 14.

In plan view the fourth area 24 also exhibits a rectangular outline with the sides having a prevalent development parallel to the direction of the main advancement direction 6 and opposite shorter sides positioned at the inlet station 11 and the outlet station 12.

The fourth zone 24 is configured such as to impart on the articles resting thereon an advancement motion along the main advancement direction 6 and in a lateral movement 15b in a distancing direction from the first zone 13.

In other words, the lateral movement 15a, 15b imparted by the second zone 14 and the fourth zone 24 are in the same direction but opposite senses, respectively directed distancingly from the first zone 13.

In this case too the second zone 14 and fourth zone 24 of the diverger module 10 include at least a respective movement element 34, 36 and in particular a plurality of elements 34, 36 destined to define the respective roller planes 35, 37 having rollers with an inclined axis with respect to the main advancement direction 6 such as to impart the above-mentioned advancement motion towards the outlet station 4 and the lateral movement 15a, 15b in a distancing direction from the first zone 13 of the diverger module 10.

As previously mentioned, the illustration is by way of non-limiting example and therefore the roller planes 35, 37 can be realised having inclined axes with respect to the advancement direction in a different way with respect to the direction illustrated, and also different from roller to roller and with a plurality of rollers having a cylindrical and/or truncoconical profile and also obviously it will be possible to configure the second and the fourth zone of the diverger module, using conveyor belts which have rollers mounted idle at respective cavities of the belts such as to impart the advancement and distancing motions described herein above (FIGS. 15 and 16).

In the last case, the second and fourth zones 14, 24 are structurally similar to the representations of FIGS. 4-12 with the only difference being connected with the orientation of the axis of the rollers for generating the distancing component 15a, 15b.

Alternatively, in the second and fourth zones 14, 24 too roller planes can be used having their axes perpendicular to the direction 6 which are however inclined with respect to the horizontal plane in a distancing direction from the first zone 7 such that it is gravity which defines the thrust component towards the third and fifth zone 16, 25, while the roller planes direct the articles exclusively towards the outlet station 12. The diverger module 10 further comprises at least a fifth zone 25 flanked to the fourth zone 24 along the advancement direction 6 from the side opposite the first zone 13.

In this case too, the articles at the fifth zone 25 are moved exclusively along the advancement direction 6 to the outlet station 12 (resultant R).

The fifth zone 25 could start anywhere between the inlet station 11 and the median line of the outlet station 12 as the converger module 2 will bring the articles to the centre of the singulator.

Figure 3:
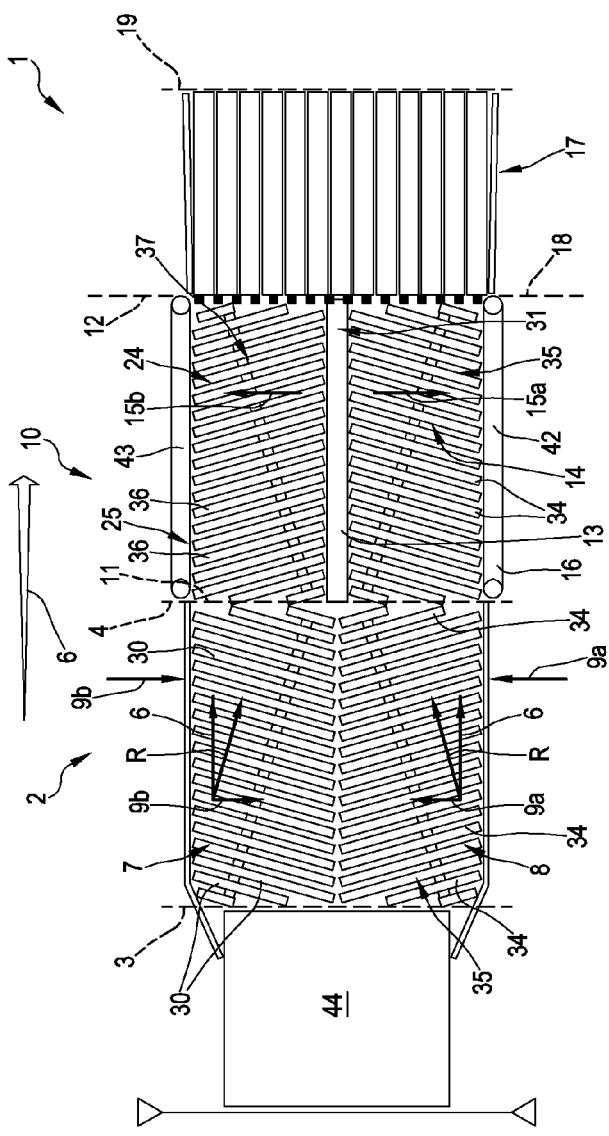
FIG. 3 illustrates a further variant of the singulator of FIG. 1.

Note that the third and the fifth zones 16, 25 of the diverger module 10 might be formed by a respective lateral wall 42, 43 which emerges from a median plane of the diverger 10 (FIGS. 1, 3, 15).

In particular in the case of the third zone 16 of the diverger module 10, the lateral wall 42 will emerge from the median plane of the zone 21 and will be configured so as to restingly receive the articles 5 pushed by the second zone 21 distancingly from the first zone 20 and configured such as to enable a movement along the main advancement direction 6 towards the outlet station 19.

In particular, the lateral walls 42, 43 will consist of conveyor belts with the axis of rotation of the rollers on which they move being arranged perpendicular with respect to the planes constituting the first, second and fourth zones of the diverger module; in other words, the belt will emerge vertically from the median plane of the diverger module.

In addition, the side walls 42 and 43 will generally be motorized so as to actively impart the motion towards the outlet station 19.

Obviously, the fifth zone 25 of the diverger module 10 will include the respective lateral wall 43 in a completely symmetrical and specular way, as described above with reference to the lateral wall 42.

Figure 13:
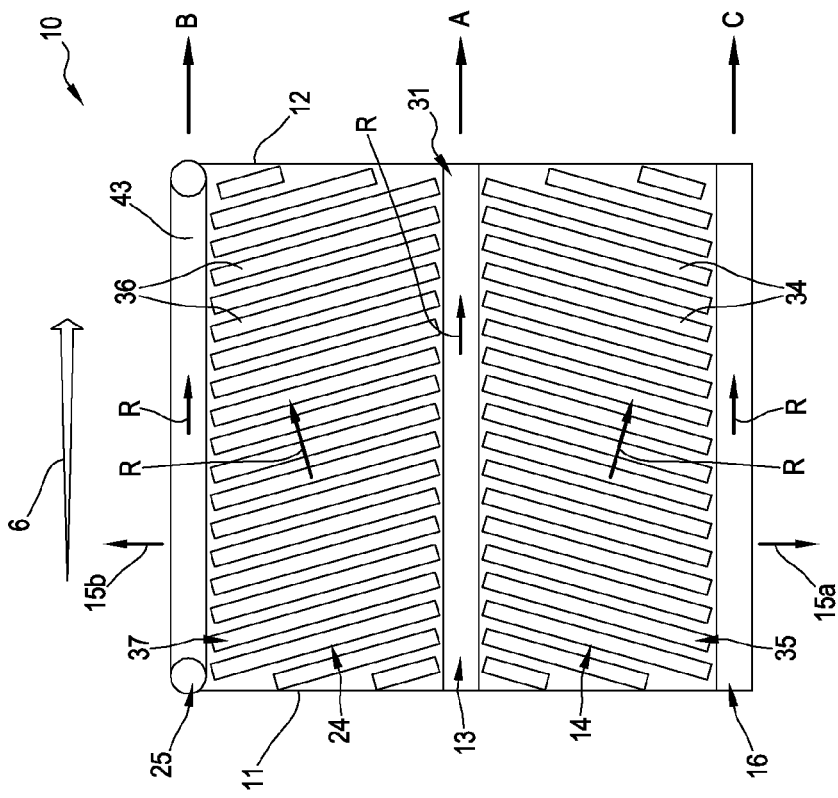

In an alternative embodiment illustrated in FIG. 13, the lateral walls 42 and 43 at the third zone 16 and the fifth zone 25 of the diverger module 10 may be replaced by the respective conveyor belts (in the plane), for example with high friction able to move the articles which might arrive resting thereon exclusively along the main advancement direction 6.

In the further alternative (FIG. 16) the conveyor belts may be replaced by conveyor belts exhibiting seatings having rollers mounted idle, suitable for directing the articles resting thereon exclusively in the main advancement direction 6.

Figure 14:
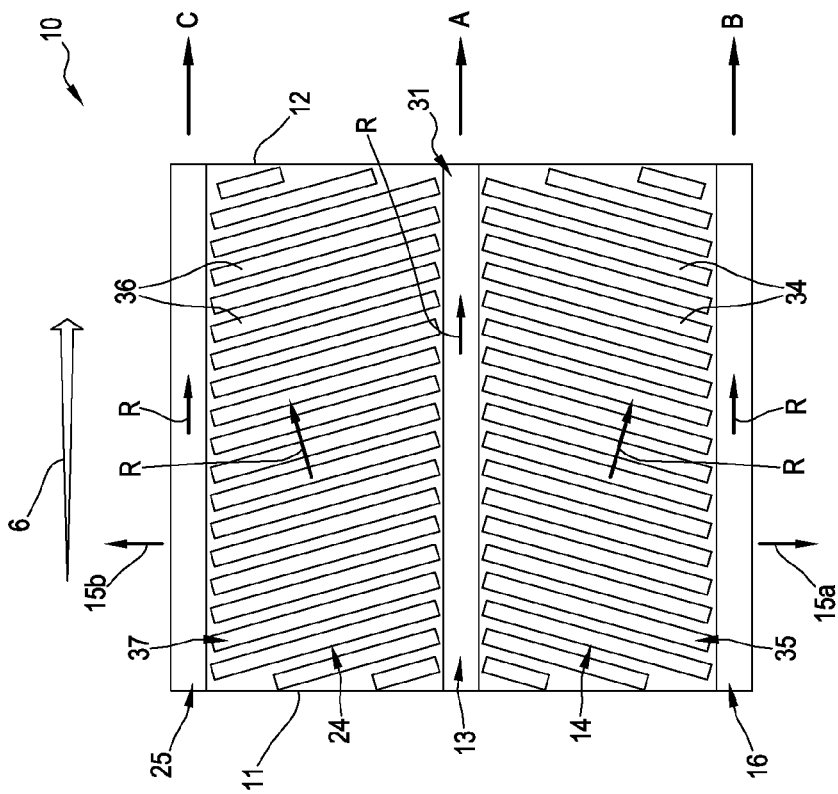

Combinations of the above solutions are also possible, see for example FIG. 14 in which an emerging lateral wall 43 and a conveyor belt on the opposite side are used.

Looking at the singulator shown in FIG. 1, note the presence of a selector module 17 located downstream of the diverger module 10 along the main advancement direction 6.

As in the above description, even the selector module 17 is illustrated immediately downstream of and consecutively placed to the diverger module 10.

However, an intermediate transfer module might be present, which could still enable the selector module 17 to function optimally without forsaking the inventive concept as described.

In any case, the selector module 17 develops between a respective inlet station 18 and an outlet station 19 and exhibits a respective first zone 20 configured such as to receive the articles in arrival from the zone 13 of the diverger module 10 and impart on the articles resting thereon an advancement motion exclusively along the main advancement direction 6 from the inlet station 18 to the outlet station 19.

The selector module 17 further exhibits a second zone 21 configured such as to receive the articles in arrival from the third zone 16 of the diverger module 10 such as to impart, on the articles resting thereon, an advancement motion along the main advancement direction 6 (exclusively) from the inlet station 18 to the outlet station 19.

Further, the selector module 17 might also comprise a third zone 26 configured so as to receive the articles arriving from the fifth zone 25 of the diverger module 10 such as to impart, on the articles resting thereon, an advancement motion exclusively along the main advancement direction 6 from the inlet station 18 to the outlet station 19.

FIG. 1 illustrates the presence of a plurality of independent conveyor belts that define the advancement direction of the articles positioned parallel to the main advancement direction 6. As an alternative to conveyor belts, roller planes or rollers having axes perpendicular to the advancement direction can equally be used, as can conveyor belts provided with special cavities suitable for mounting idle rollers which direct the articles as cited above.

Figure 17:
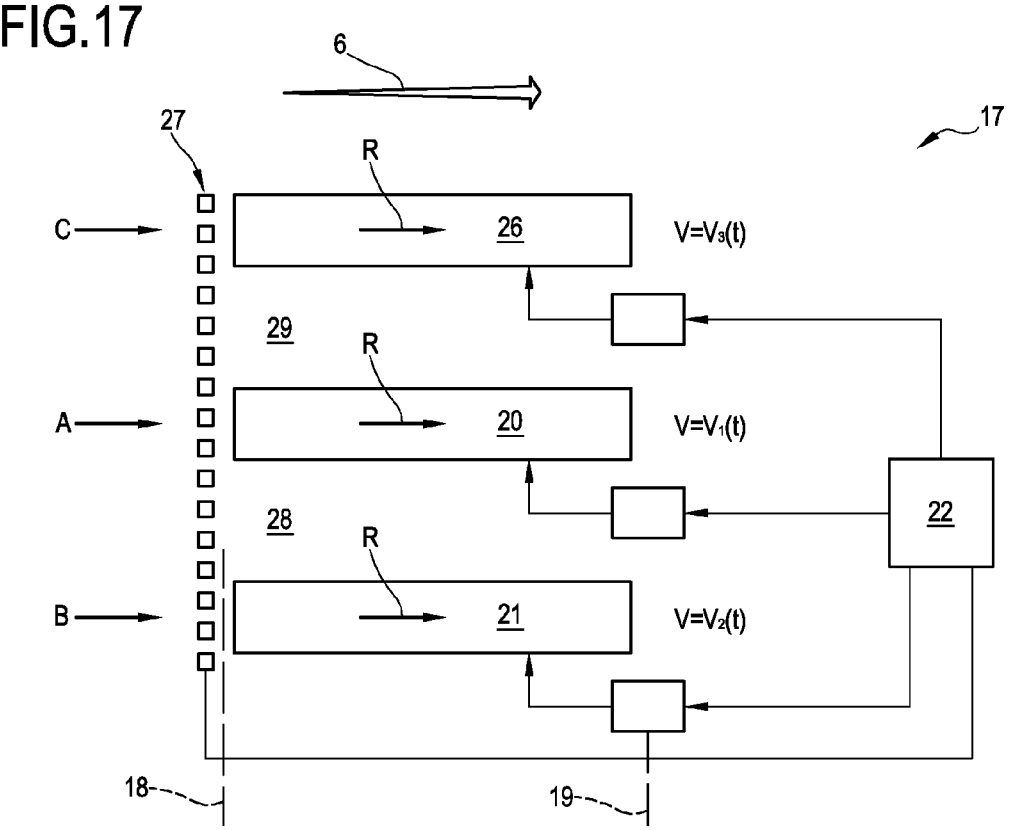
FIGS. 17 and 18 illustrate two possible variants of the selector module.
Figure 18:
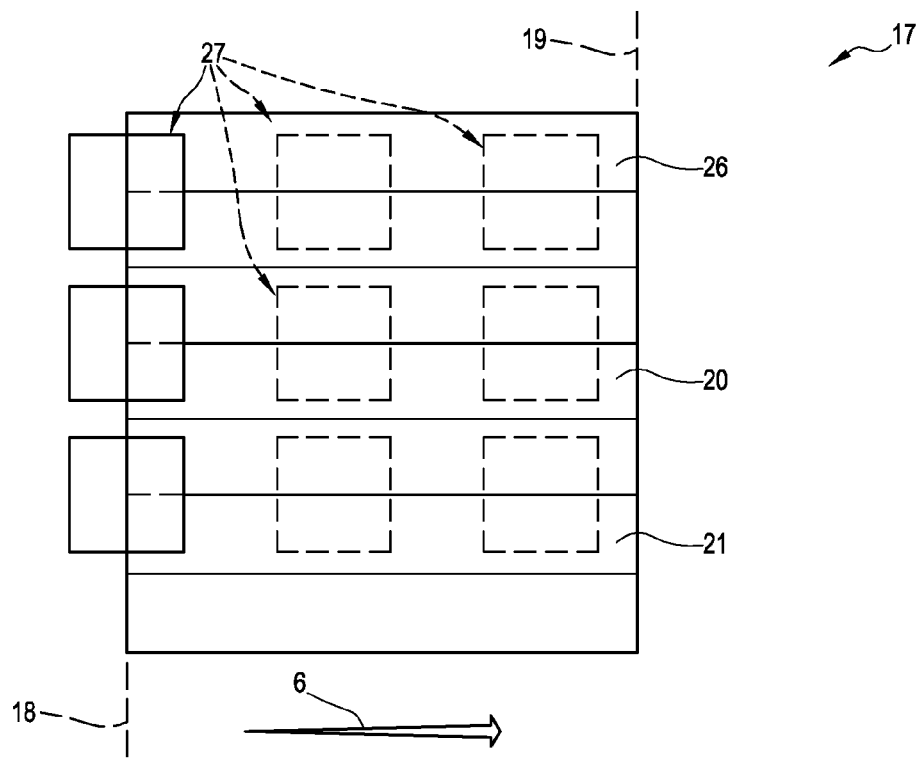

Further, the selector module 17 can be configured to comprise only moved conveyor belts positioned in the zones destined to receive the products in outlet from the diverger module 10 (FIG. 17), or also a plurality of conveyor belts all moved independently of each other and side by side so that a control unit 22 can appropriately control the movement (FIGS. 1 and 18).

FIG. 1 illustrates the situation of a plurality of conveyor belts flanked to one another; on the other hand FIG. 17 illustrates a situation in which the selector module 17 comprises a fourth zone 28 flanked and interposed between the first and second zones 20, 21 along the main advancement direction 6 and a fifth zone 29 flanked and interposed between the first and the third zone 20, 26 along the main advancement direction 6.

The fourth and fifth zones 28, 29 according to this specific embodiment, are developed from the inlet station 18 to the outlet station 19 and comprise surfaces that are not moved, for example exhibiting low friction. As can be observed from the accompanying FIG. 17, the device also includes a control unit 22 which is active at least on the first zone 20 of the selector module 17 such as to impart the advancement motion along the main advancement direction 6 with an initial velocity profile, and is also active at least in the second zone 21 of the selector module 17 to impart the corresponding advancement motion along the main advancement direction 6 with a second velocity profile which can also be different from the first velocity profile.

The control unit 22 will also be active in the third zone 26 of the selector module such as to impart thereon an advancement motion along the main advancement direction 6 with a third velocity profile that can be different from both the first and the second velocity profile as will be more fully described in the following.

In detail, and as shown in the accompanying figures, the singulator is also equipped with a detection system 27 serving the control unit 22.

This detection system 27 will be able to detect over time the passage of the articles 5 inlet and/or in transit to the selector module 17, at least at the first and second zones 20, 21 (and generally also the third zone 26).

Purely by way of example, there may be a linear array of photocells along the line or the inlet station to the selector module so that the control unit 22 can receive the signal from each sensor of the detection system 27 and know the position and the passage time of the various articles crossing the inlet station 18 of the selector module 17.

The above-described embodiment can only use an arrangement of photocells at least at the first, second and third zone of the selector module 17 and in general throughout the line that defines the inlet station 18 of the module itself.

Alternatively, or in combination, other types of sensors can be used, such as one or more cameras (FIG. 18) able not only to detect the shape of the product passing through the inlet station, but to identify, for example from above, the profile of the article 5 and follow it in its advancing motion though the selector module 17 so that this type of movement can be actively controlled (see for example FIG. 18).

As mentioned, the control unit 22 receives in inlet signal/signals coming from the detection system 27 and uses them to determine the velocity profiles to be assigned to zones 20, 21 and 26 of the selector module 17.

In particular, the velocity profiles are set in order to enable outlet of the products from the outlet station 19 of the selector module 17 in a singulated configuration, i.e. not superposed along the transversal development of the selector module 17.

As more fully explained later, should two articles be on the selector module 17, for example in the first and second zones 20, 21, partially or totally superposed if observed laterally, the control unit 22 is able to slow or stop the motion of the articles in the first zone 20 or in the second zone 21 so as to obtain outlet of a single product from the outlet station 19 before allowing the product present in the other zone or advancement line.

In other words, the velocity profile is appropriately changed (even bringing the rate to 0) in order to obtain a single outlet of the products of the three advancement lines A, B, C through the outlet station 19.

With reference to the selector module 17, a significant third embodiment thereof is illustrated in FIGS. 23 to 26.

In particular, and as previously mentioned, the first zone 20 is destined to receive the advancing articles along a main flow A, mainly from the first zone 13 of the diverger module 10.

In reality, this zone 20 will have transversal dimensions that are greater than those of the remaining second and third zones 21, 26 and therefore could receive, in certain situations, articles for example of large dimensions from rows B or C.

In any case, looking at the first zone 20, it can be seen that it comprises a respective transport device 53 provided with three transport surfaces 53a, 53b, 53c which can be distinguished at least on the basis of some structural and/or functional characteristics.

In particular, all three transport surfaces of the first transport device 53 extend from the inlet station 18 to the outlet station 19 and are, in a view from above (see FIG. 23), in an elongate rectangular shape with larger sides opposite arranged parallel to the main advancement direction 6.

These transport surfaces 53a, 53b, 53c are flanked and adjacent to one another, with the first transport surface 53a being of larger transversal dimensions (about double) than the respective transversal dimensions of the transport surfaces 53b, 53c (generally equal to one another); the first surface 53a is interposed between the further surfaces.

In general each of the transport surfaces 53a, 53b, 53c will be an area of active transport surface, i.e. a mobile transport surface suitable for generating on an article totally or partly resting thereon an advancement motion directed from the inlet station 18 to the outlet station 19 along the main advancement direction.

The first transport surface 53a will have a coefficient of friction (much) higher than the corresponding coefficient of friction of the adjacent transport surfaces 53b, 53c.

In other words, an article resting contemporaneously on at least two of the transport surfaces, will receive the greater thrust component from the first transport surface 53a, with greater friction.

Note also how the three transport surfaces of the first device 53 will present an advancement speed from the inlet station 18 to the outlet station 19 that are equal as they will in general be moved by a same first transport device 53.

In the embodiment illustrated in FIGS. 23-26 transport surfaces 53a, 53b, 53c are shown that are distinct and separate from one another, which could however all be defined by a single uninterrupted surface with areas that are distinct only in terms of coefficient of friction.

Further, the embodiment shown is constituted by three separate conveyor belts (endless belts) in continuous motion about at least two shafts having axes parallel to each other and arranged respectively at the lines defining the inlet station 18 and the outlet station 19.

Figure 23:
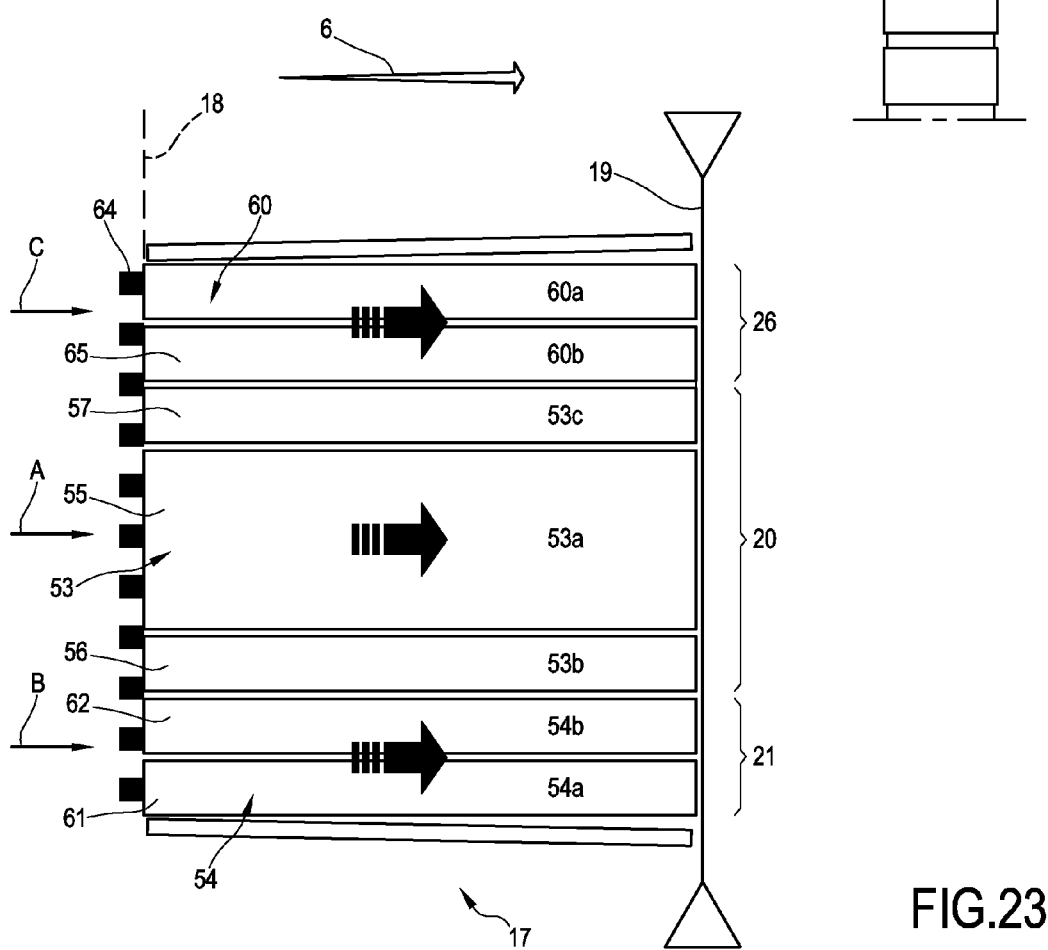
FIG. 23 is a view from above of a selector module according to an alternative and advantageous embodiment.
Figure 24:
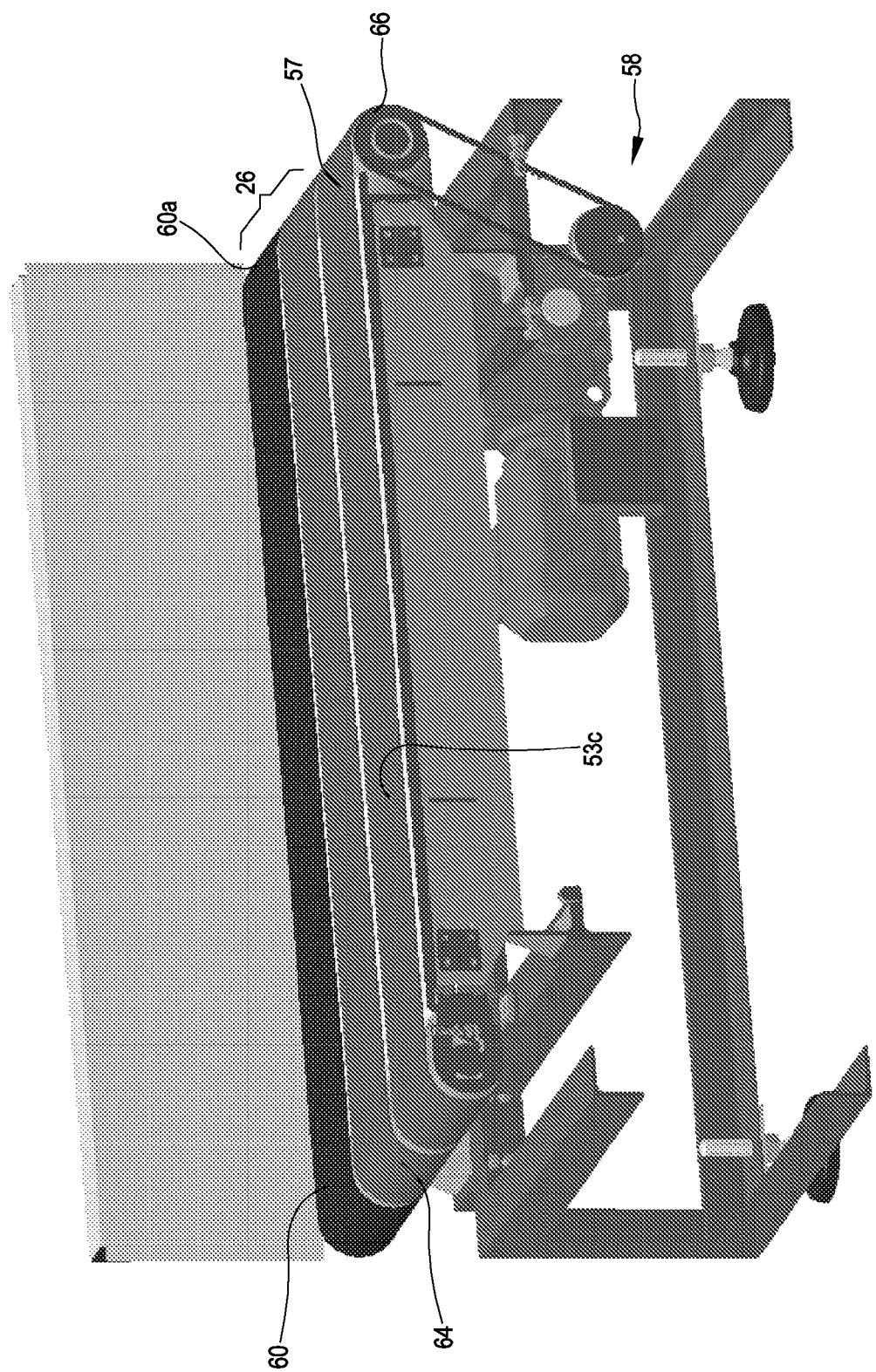
FIGS. 24, 25, 26 are further views of the selector of FIG. 23 with some parts removed in order better to evidence others.

In still other terms, each of the conveyor belts 55, 56, 57 will be placed on these two shafts such as to impart, on the upper surface, a movement indicated by the arrows in FIG. 23 and directed along the main advancement direction 6.

Figure 25:
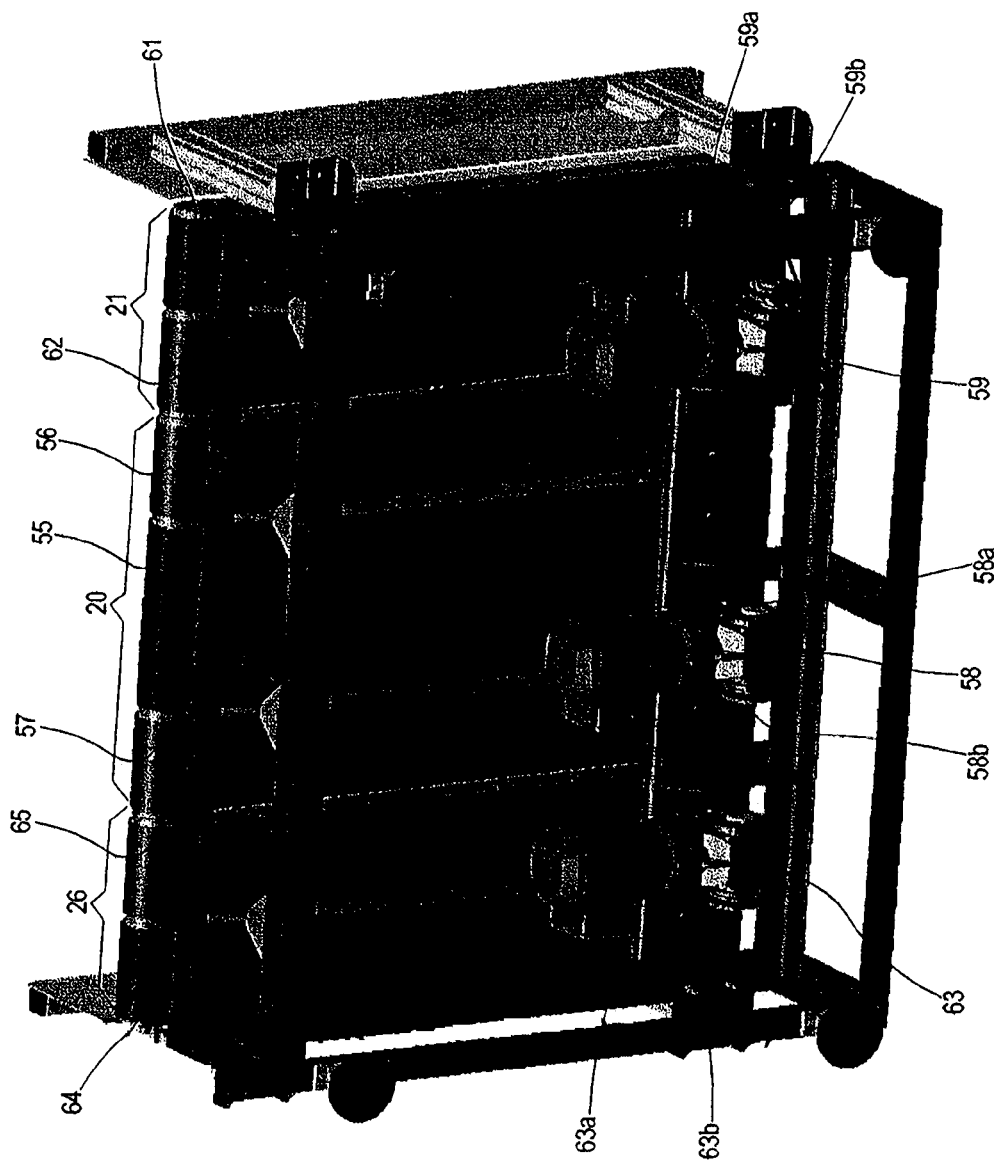
Figure 26:
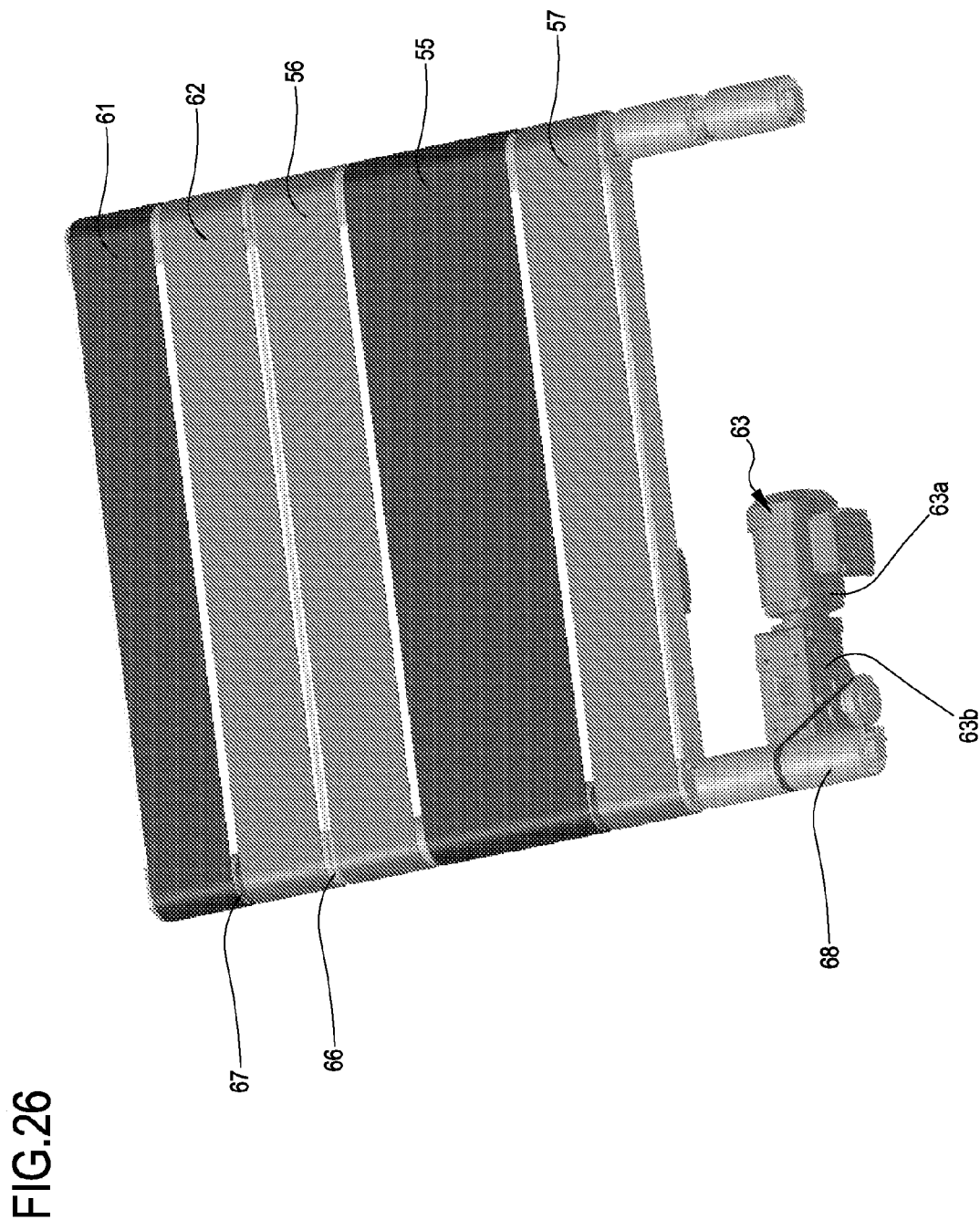
Figure 27:
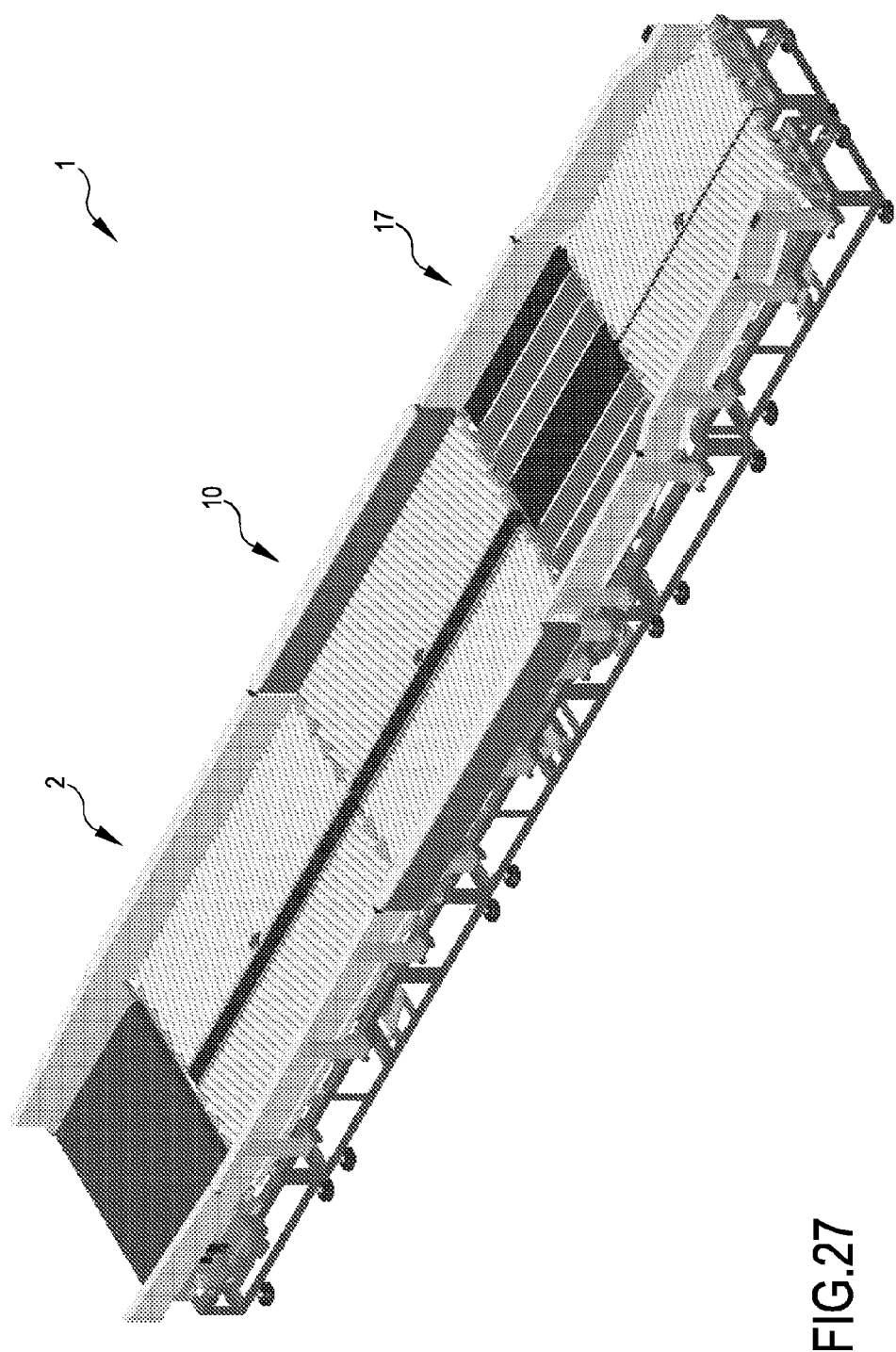
FIG. 27 is a perspective view of the singulator in a further embodiment.

From the point of view of motorisation, the first movement system 58 is shown in FIG. 25 and comprises a motor 58a and a suitable transmission 58b (such as a gear reducer) that transmits the motion via a belt around a respective shaft 66 about which the conveyor belts 55, 56, 57 rotate, thus being drawn by the shaft 66 which determines a constant advancement velocity that is substantially identical for the three belts.

Returning to the embodiment illustrated in FIG. 23, note how the second zone 21 has a second motion transmission device 54 also defined by two transport surfaces 54a, 54b extending from the inlet station 18 to the outlet station 19 having a rectangular shape in a view from above, with longer opposite sides positioned parallel to the main advancement direction 6.

In this case too the transort surfaces 54a, 54b are positioned adjacent and flanked along the main development direction 6.

In particular, the second transport surface 54b is flanked and adjacent to the second transport surface 53b of the first device 53 such as to define a substantially continuous support surface for the articles arriving from the diverger module.

In this case too the first rest surface 54a exhibits a coefficient of friction will exhibit a coefficient of friction that is greater than that the second rest surface 54b.

The illustrated embodiment includes two belts having substantially identical transversal dimensions, with the transversal dimensions of the second and third transport surfaces 53b, 53c of the first transport device 53 being substantially identical.

The belts are two distinct conveyor belts 61, 62 the surface of which defines the active transport surface area 54a and 54b.

In this case too, the embodiment might be constituted by a single conjoined uninterrupted belt that defines the two transport surfaces 54a and 54b with a different surface coefficient of friction.

The second movement system 59 shown in FIG. 25 is substantially similar (and only differently positioned in the structure of the selector module 17) to the one previously mentioned.

The system comprises a motor, for example electric 59a, and a transmission 59b (for example a gear reducer and a belt) which transmits motion to a shaft 67 active on the first and second conveyor belt 61, 62, previously mentioned.

Thus, in this case too the motion transmitted to the two conveyor belts 61, 62 will be the same with the same velocity between the inlet station 18 and the outlet station 19 of the transport surfaces 54a and 54b.

Note, however, that the motorisations of the first transport device 53 and the second transport device 54 are independent and therefore also their advancement velocity will be independent (i.e. they can also be the same at certain moments, but will in any case be commanded and managed independently by the control unit 22).

In a simpler logic control the belts could be moved at a constant velocity, or, conversely, be stationary, thus defining the velocity profiles.

The selector module 17 further includes a third transport device 60 also having a first transport surface 60a and a second transport surface 60b.

The transport surfaces extend from the inlet station 18 up to the outlet station and have a substantially quadrangular profile shape with the longer sides thereof arranged parallel to the main advancement direction 6.

The two transport surfaces 60a, 60b are positioned parallel and adjacent to each other.

Furthermore, the second transport surface 60b is located adjacent with respect to the third transport surface 53c of the first transport device 53.

In this case too the first transport surface 60a will exhibit a greater coefficient of friction than the second transport surface 60b of the third transport device 60.

The surfaces can be obtained through the use of two distinct and separate elements (as shown) or even a single element with surface properties of coefficient of friction at the two distinct surfaces.

Again, this embodiment comprises the use of two separate conveyor belts 64, 65 which are mounted on respective shafts positioned at the inlet and outlet stations 18 and 19 as previously described. In particular, observing the selector module 17 from above (FIG. 23) the presence will be noted, between one side and the other of the selector module of the first transport surface 60a and the second transport surface 60b of the third transport device 60, the third transport surface 53c, the first transport surface 53a and the second transport surface 53b and the first transport device 53 and the second transport surface 54b followed by the first transport surface 54a of the second transport device 54.

The assembly described above will cover substantially the entire transversal extension of the selector module 17, while possibly leaving small gaps between the conveyor belts, which however do not enable the occurrence of snagging, falls or otherwise cause problems of any sort to any of the products or the articles transportable by the singulator.

In this case too, the third movement system 63 will exhibit a respective motor 63b, in particular an electric motor, and a respective transmission 63a (a gear reducer and a belt); the transmission 63a will be active on a respective shaft 68 (see FIG. 26) in order to move the first and second surfaces 60a, 60b with the same advancement speed from the inlet station 18 to the outlet station 19.

In this way, the two conveyor belts 64, 65 will also move at the same velocity which velocity, being controlled independently, may be different, or in any case independent, both of the first advancement velocity of the first transport device 53 and the advancement velocity of the belts of the second transport device 54.

It should also be noted that the specific embodiment has conveyor belts 55, 56, 57, 61, 62, 64, 65, though the same functions might be obtained through the use of the respective roller planes with different coefficients of friction (e.g. smooth rollers flanked by rubberised rollers); the various functions can also be obtained from a single continuous roller plane having axes of rotation that are perpendicular to the main advancement direction 6 in which the various above-described transport areas will differ due to portions having different coefficients of friction. It is also possible to use conveyor belts exhibiting suitable holes affording idle rollers, also having different coefficients of friction according to the transport surfaces that they are destined to define.

The above is intended to demonstrate that there can be different embodiments of the selector module according to the third embodiment, as long as they can allow active transport of articles placed on the various transport surfaces with different coefficients of friction as described.

From the point of view of distribution of surfaces with a high coefficient of friction, note that the surfaces are placed at the areas where a stream of articles is expected to be received according to the three advancement lines A, B, C.

The transport surface 53*a*, which is destined to receive the greatest flow of articles, will have larger dimensions so that the flow can effectively be optimally managed; conversely the surfaces destined to receive the articles in arrival from the advancement lines B and C will have smaller transversal dimensions as they will generally be designed to deal with a smaller number of articles.

The presence between these surfaces 53*a* and 54*a* and 60*a* of additional, low-friction transport surfaces also enables at least partially anomalous situations to be managed.

In fact, the presence of motorized belts in the zones of the high friction belt firstly enables removal of any articles that are not arranged in one of the three advancement lines A, B, C due to an error of singulation.

Furthermore, a product that might be, for example, on the advancement line B, and reach at the first transport surface 54*a*, but which exhibits very large transversal dimensions such as to additional involve the other low-friction transport surfaces 54*b* and 53*b*, will receive a higher thrust from the high-friction belt 54*a*, but also a thrust contribution from the second transport surface 54*b* (and even if of a smaller entity).

If for any reason, the central zone 21 were not moved, the second transport surface 53*b* would be stationary, but they would not exhibit a high coefficient of friction and there would be a minimal influence on the transport and rotation of any product supported on the three transport surfaces mentioned above.

Conversely, if the low-friction transport surfaces were passive surfaces, even at low friction, this could also lead to partial rotations, especially of products on high friction belts of ends having smaller transversal dimensions.

The presence of belts with differentiated coefficients of friction enables, as described above, management of any critical situations in which articles might be in undesired zones but in any case enables management of optimal transversal dimensions with only three motors, thus in any case differentiating the effect on the articles and simulating the presence of a plurality of motors/belts.

Figures 19C, 19D:
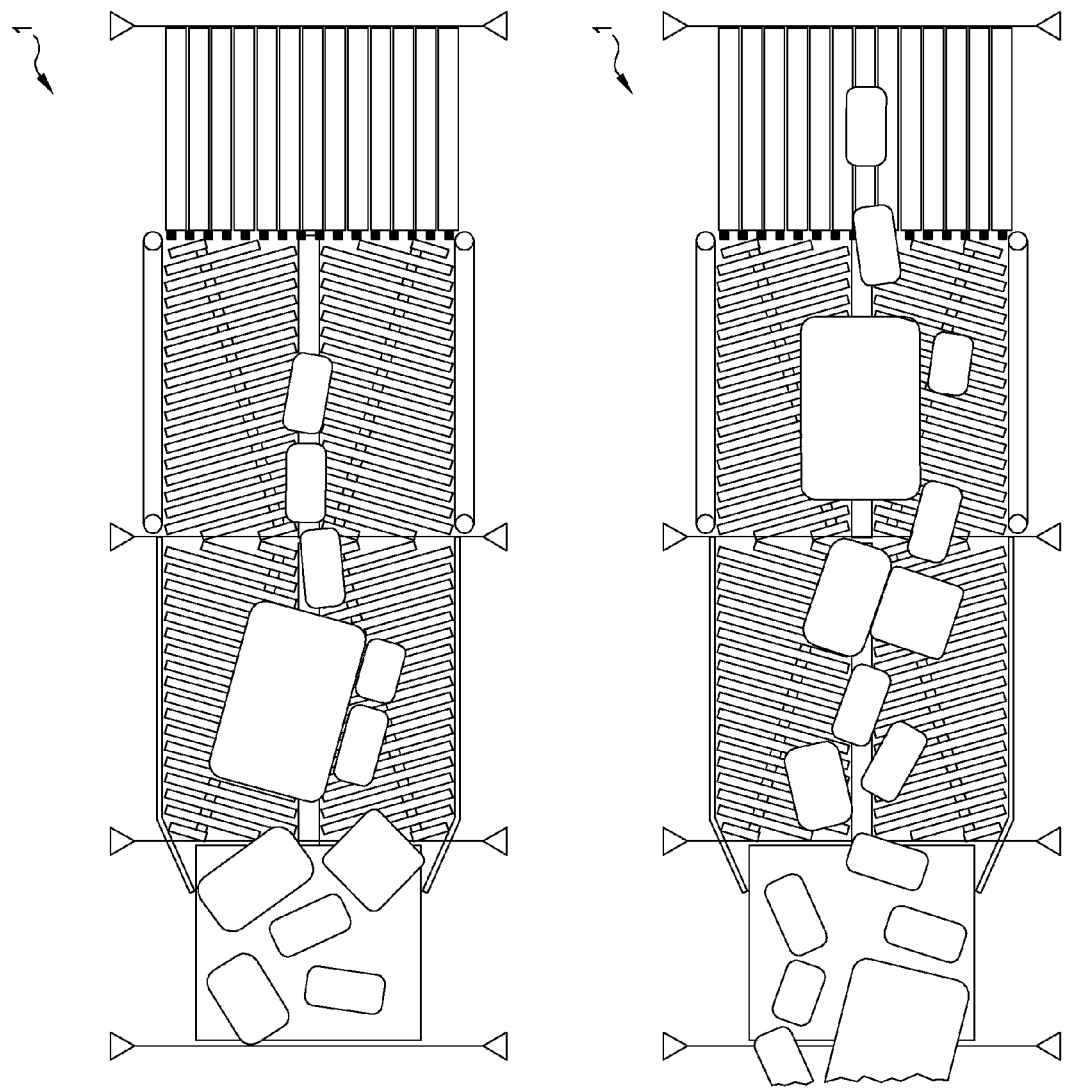
FIGS. 19A-19O shows an operating sequence of the singulator in successive temporal instants.
Figure 19E:
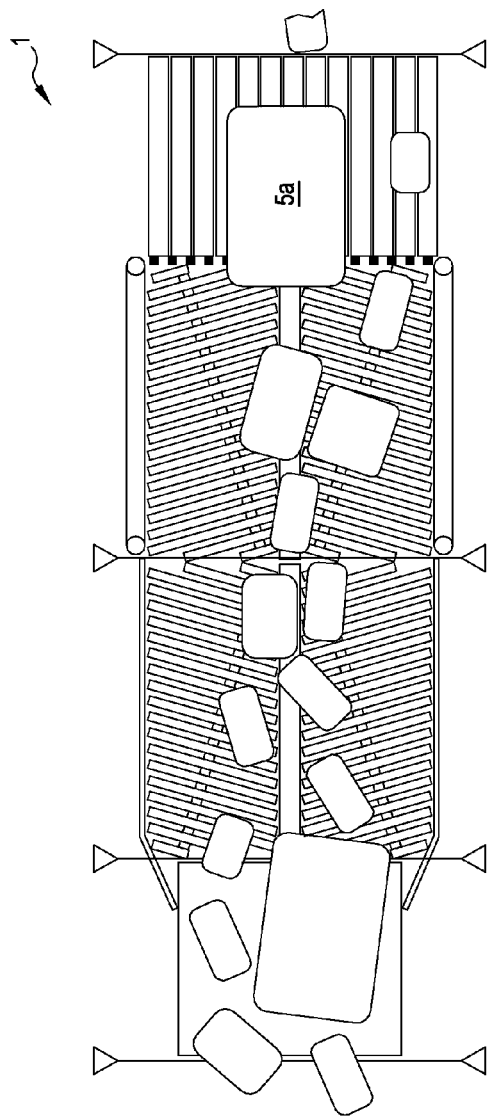
Figure 19F:
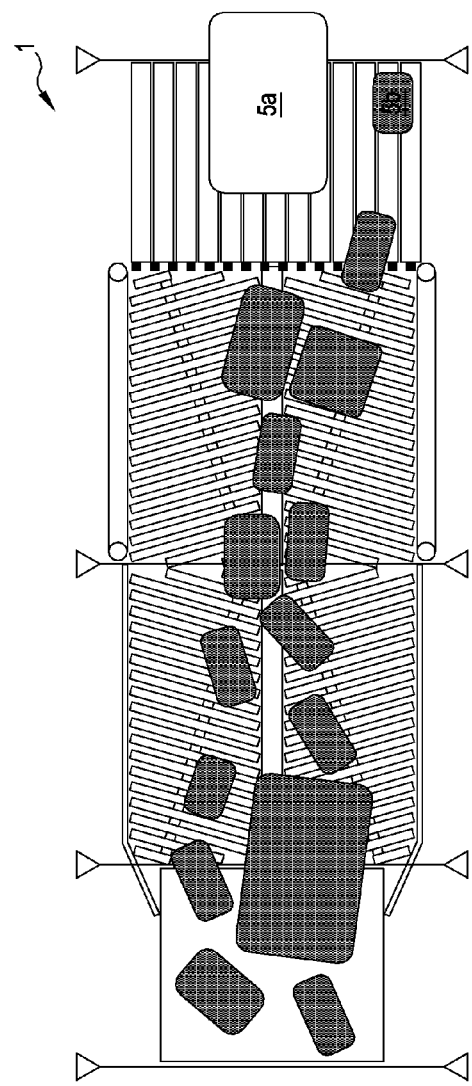
Figure 19G:
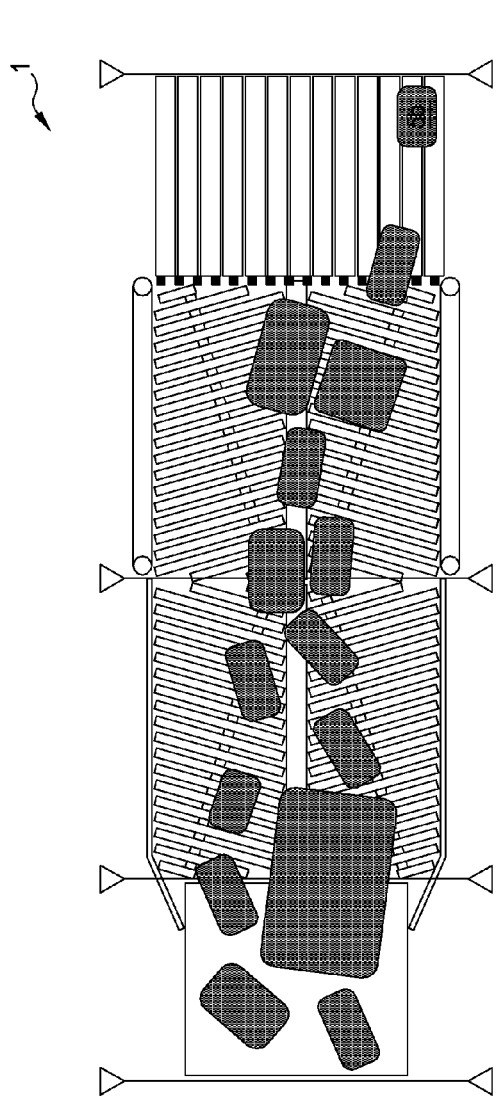
Figure 19H:
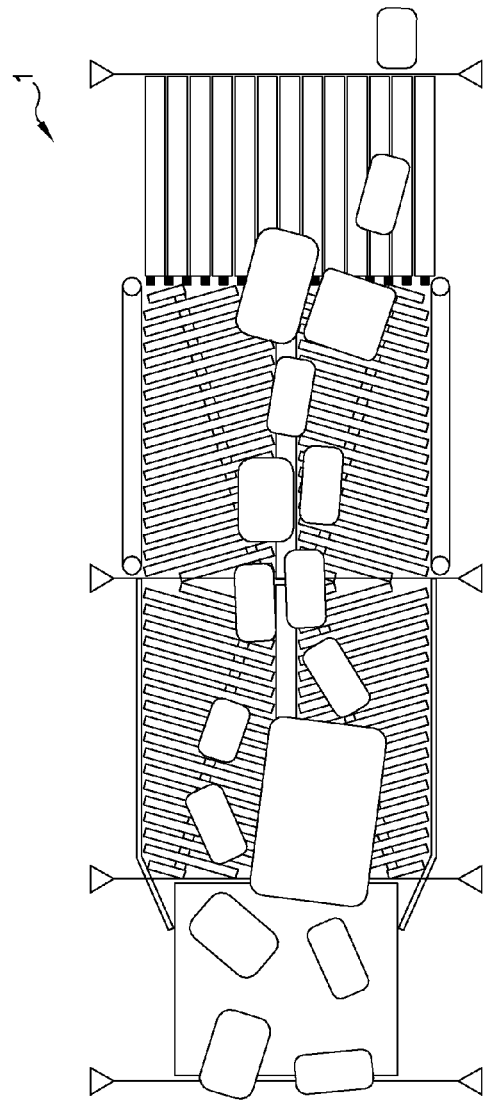
Figures 19I, 19L:
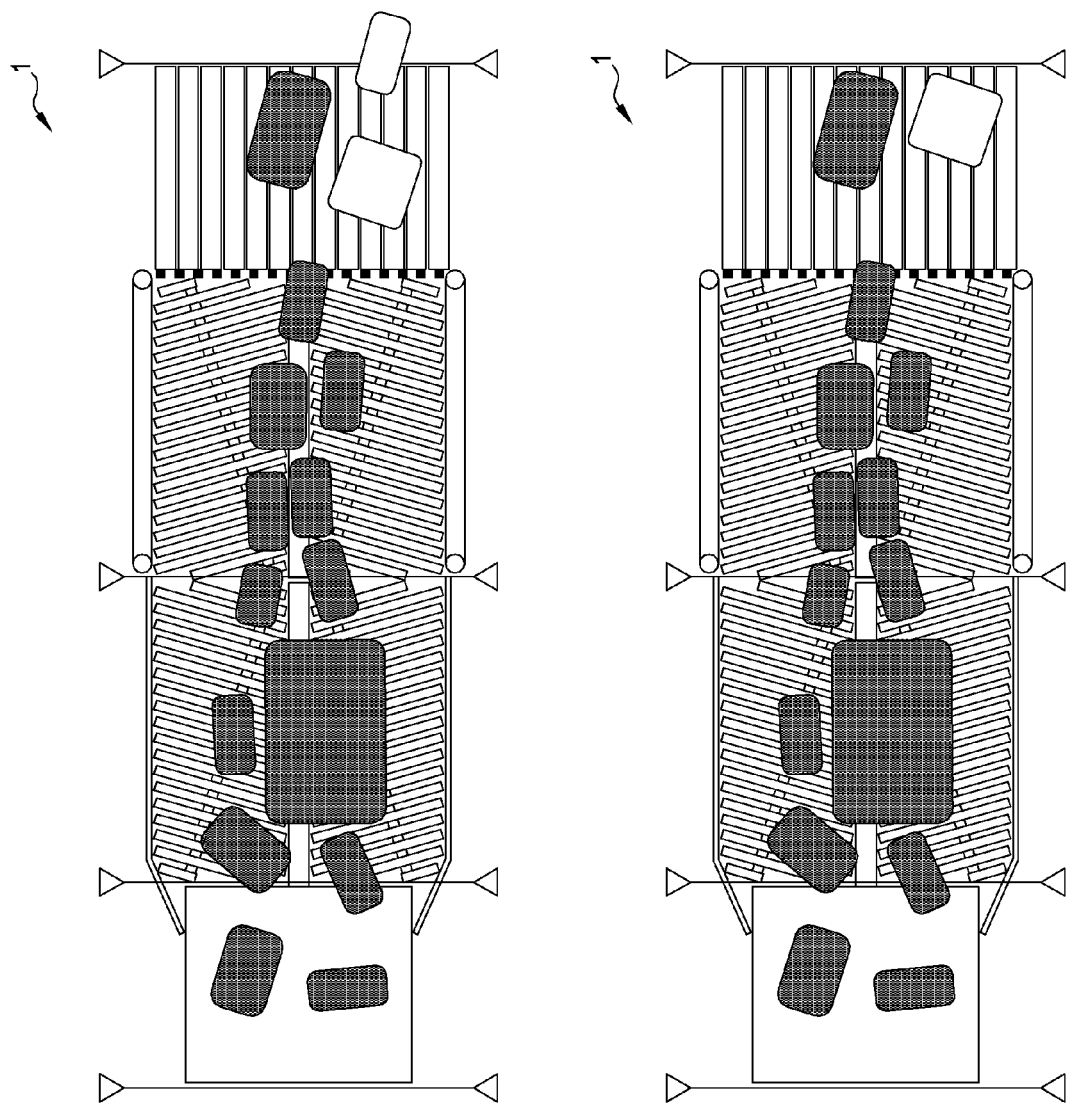
Figure 19M:
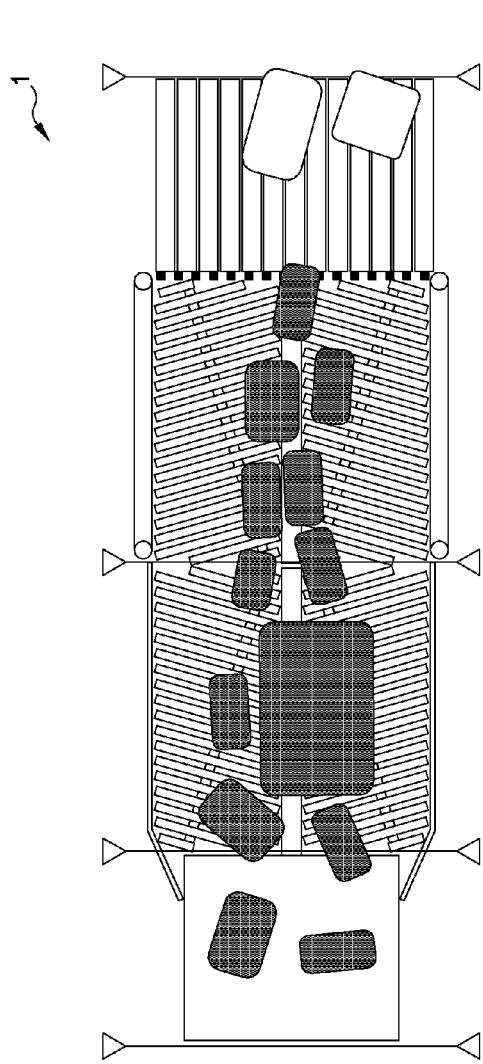
Figure 19N:
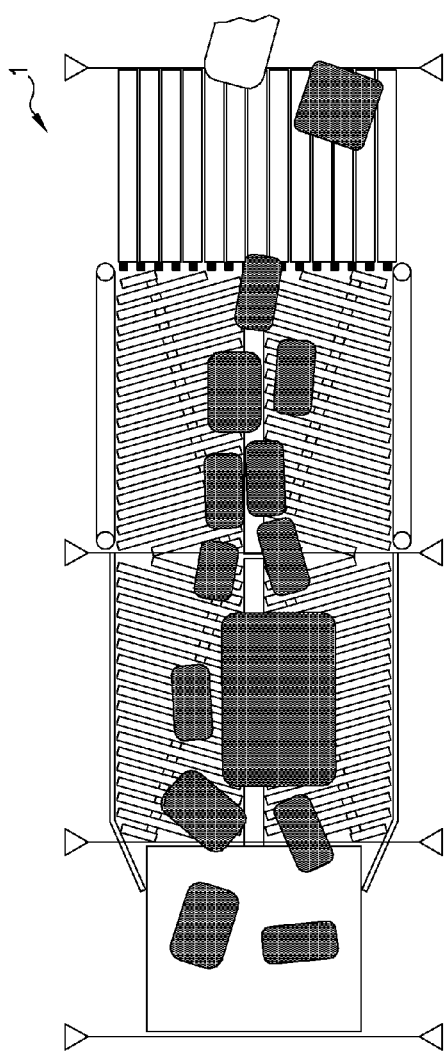
Figure 19O:
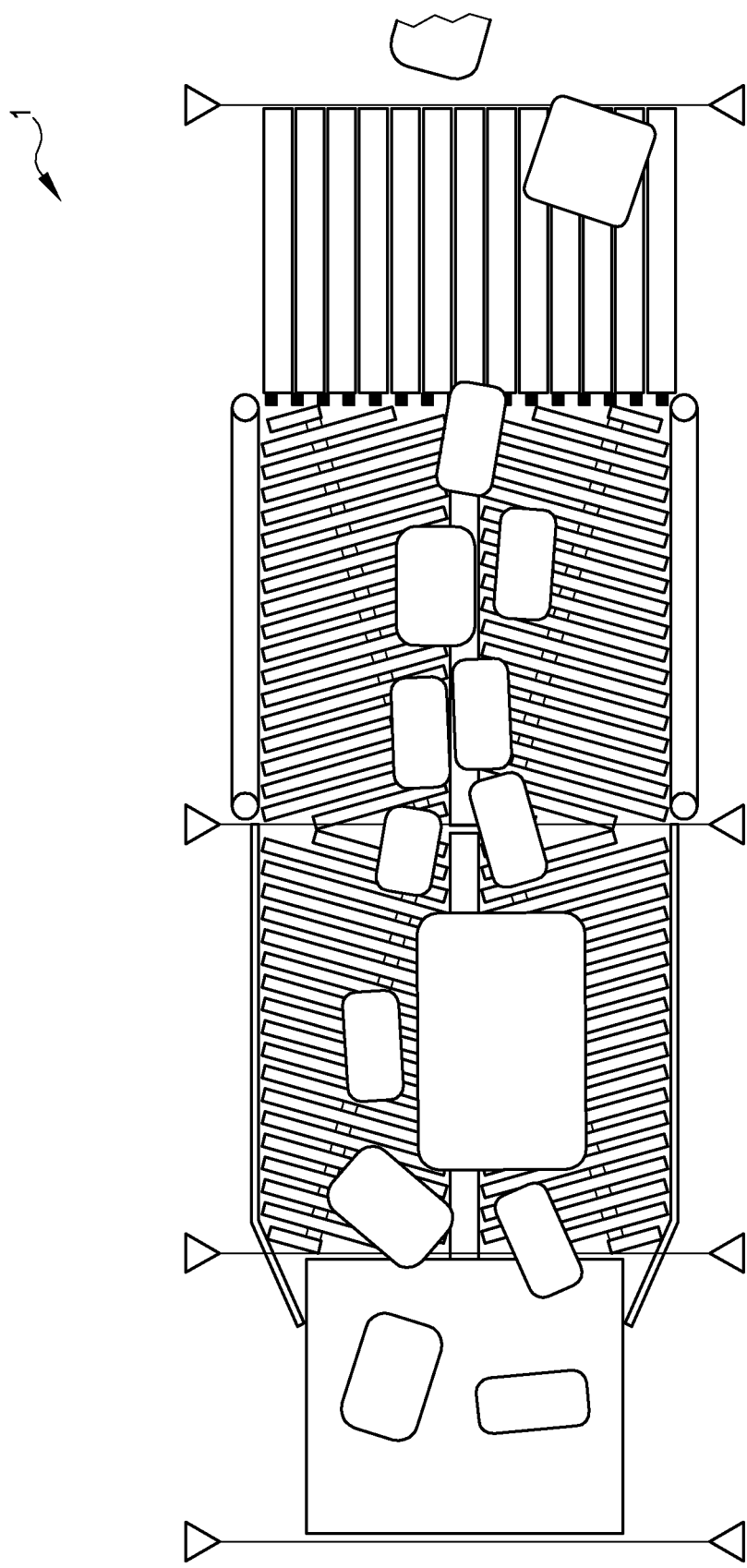

FIGS. 19A to 19O are examples illustrating the operation of the singulator briefly described above.

As can be seen from FIG. 19A, a plurality of articles arrive in loose order via the inlet conveyor belt to the inlet station 3 of the converger module.

Looking at the following sequence of figures, it can be seen how the converger module tends to bring the various articles 5 to the first zone 7, creating a first row or advancement line of the singulated products.

Where two or more items are pushed into the same portion of the first zone 7 of the converger module 2, obviously only one of the articles would remain resting the first zone 7, while the remainder would be positioned at the second or third zone (FIGS. 19C, 19D).

Thus the articles enter the diverger module 10.

Those resting in the first zone 7 come into direct contact with the first zone 13 of the diverger module.

Conversely all the articles not brought to the central area (the first area of the converger module and the first zone of the diverger module) are directed externally, in a distancing direction from the first zone 13 towards the third or the fifth zone of the diverger module up to resting on the lateral walls 42, 43 or in any case coming into contact with the third and the fifth zone of the diverger module 10.

In this way, three lines of products will be generated at the outlet station 12 of the diverger module 10 which products advance only along the main advancement direction 6: a first line A at the outlet from the first zone 13 of the diverger module 10, a second line B in outlet from the resting unloading station 12 and transported from the third zone 16 of the diverger module and a third line C supported and transported by the fifth zone of the diverger module 10.

At this stage of singulation, all products have been distributed on the three advancement lines A, B, C.

In this situation the articles pass through the detection system 27 and enter the selector module 17.

Thanks to the detection system 27, the control unit 22 is aware of the exact positioning of the individual articles along the three advancement lines A, B, C.

In the event that the simultaneous presence at a same cross section of the conveyor module 17 of two or more articles is detected on two or more advancement lines, the control unit 22 itself can differentiate the velocity profiles of the three zones in which the three product lines are located in such a way as to achieve the outlet of a single product at a time from the outlet station 19 independently of whether the superposing articles along the transverse direction are on different lines (see the sequence of FIGS. 19E to 19G where the article 5*b* superimposed on the article 5*a* is halted up to complete exit of the first article 5*a*).

In this way it is ensured that at the outlet of the singulator the products which are mainly at the central line A and possibly the auxiliary lines B and C are in any case longitudinally spaced from one another and can therefore be automatically managed and singulated in a single row with known techniques.

Figure 20:
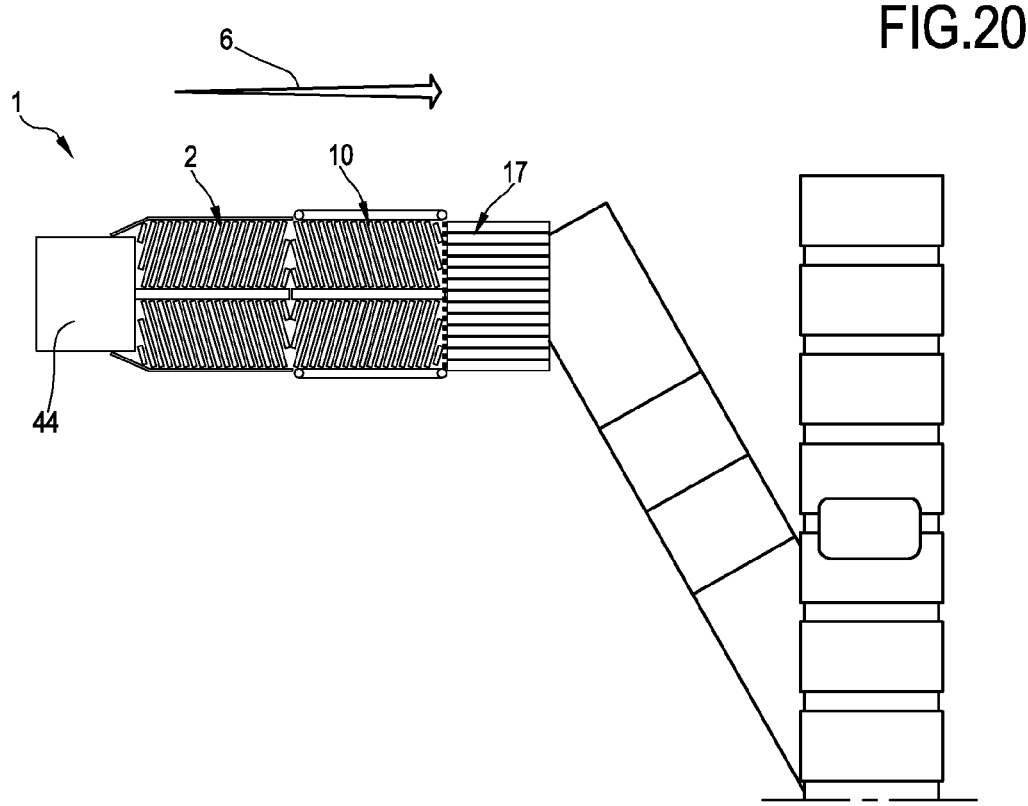
FIGS. 20, 21 and 22 show three possible variants of plants comprising the singulator of the description.
Figure 21:
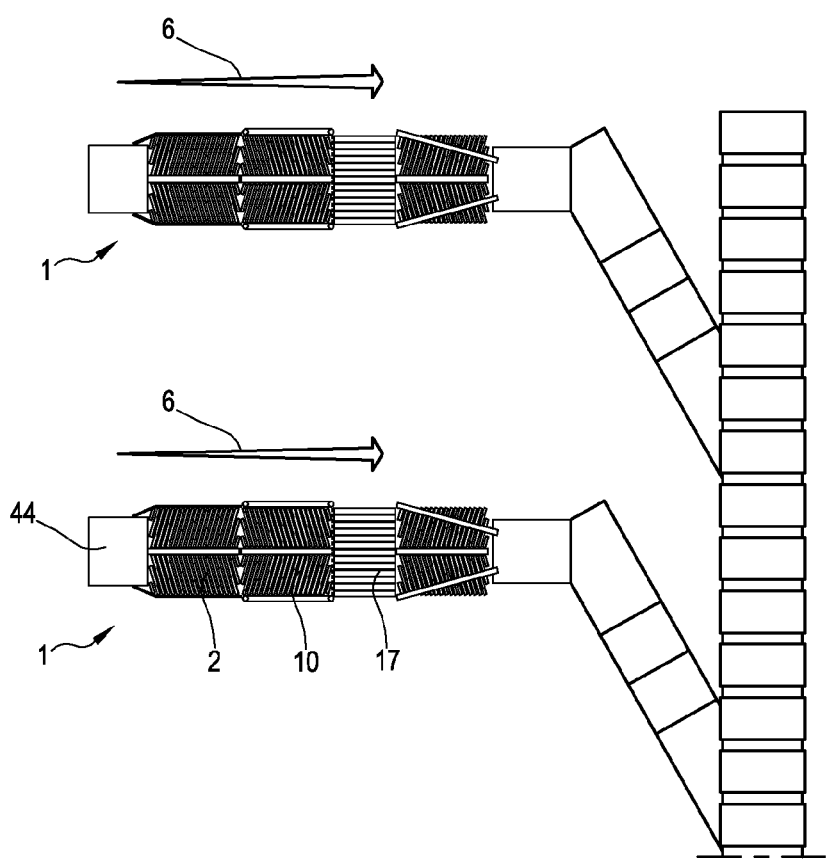
Figure 22:
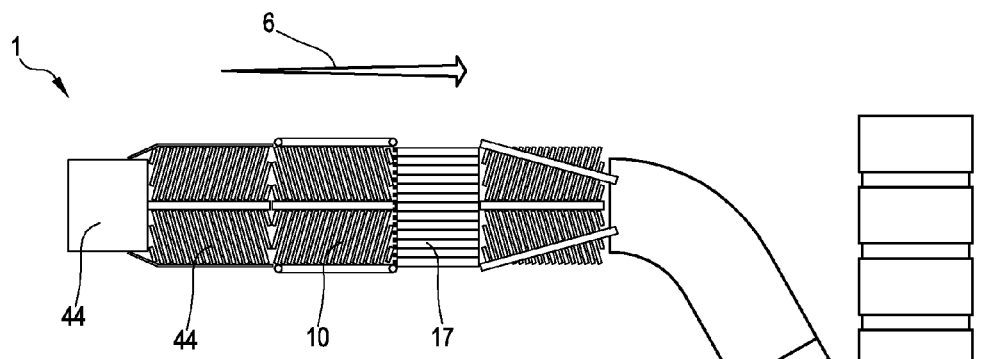

In particular, the configurations that the system can assume overall are illustrated for example in FIGS. 20, 21 and 22 where, merely by way of example, a configuration is illustrated with two singulators in inlet to a transport line (FIG. 21) and also a single singulator provided, following the selector module 17, with an element having converging side walls for bringing the elements into a single row.

Figure 28:
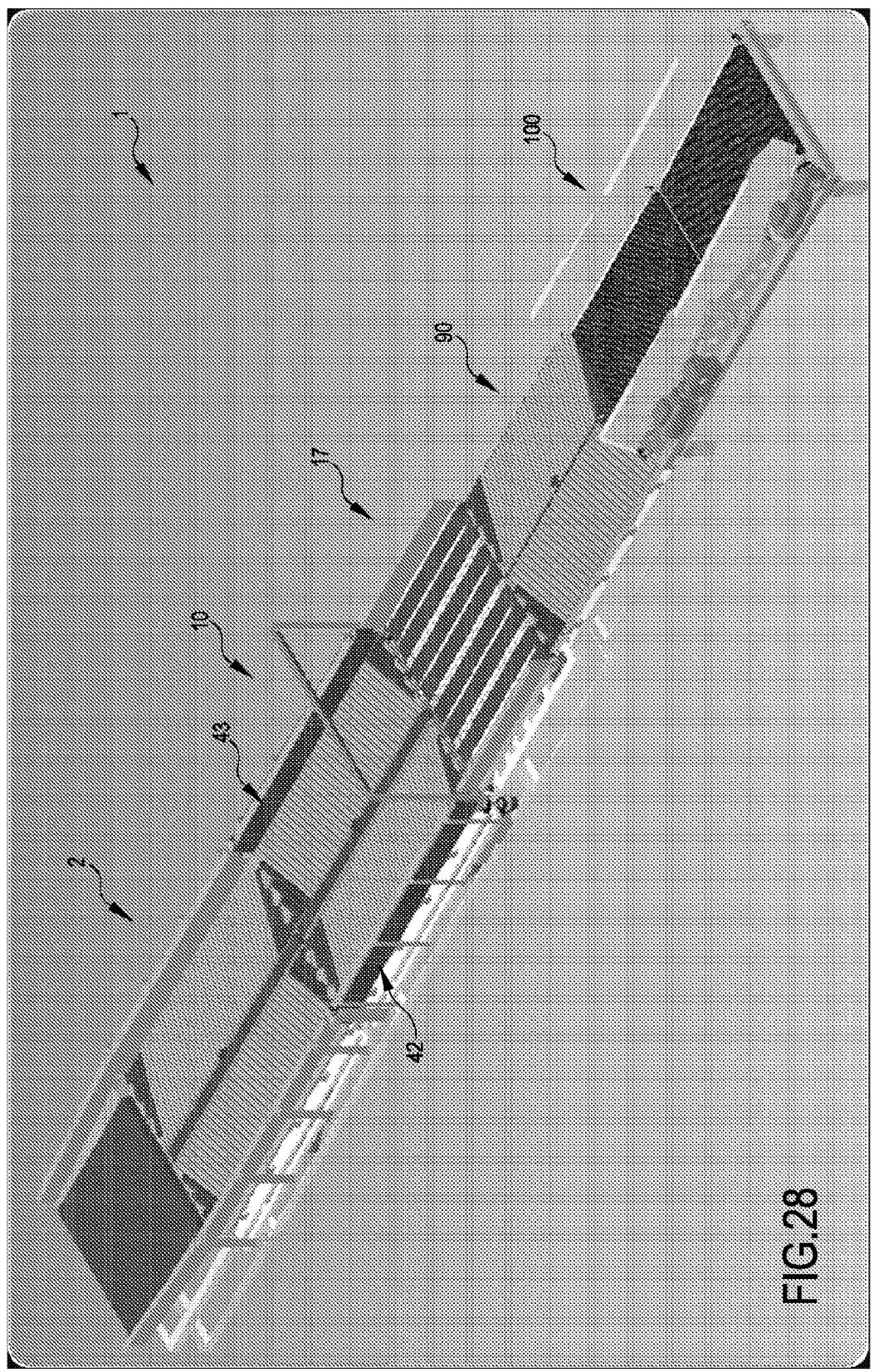
FIG. 28 shows an overall view of a singulator included in a plant for treating articles.

It should also be noted, particularly with reference to FIG. 28, that the singulator of the present description can also provide an opportunity to deviate articles in transit after the articles themselves have crossed the converger module, diverger module and the selector module, should problems of a following type occur: products not singulated or products which exceed the maximum size limit for treatment in the subsequent stations.

For this purpose use of a switcher 100 is included, in particular a vertical switcher, i.e. a structure that can define a main advancement path (normal use condition and article advancement condition) and a switching path into which the articles can be sent to a reject area.

Figure 29:
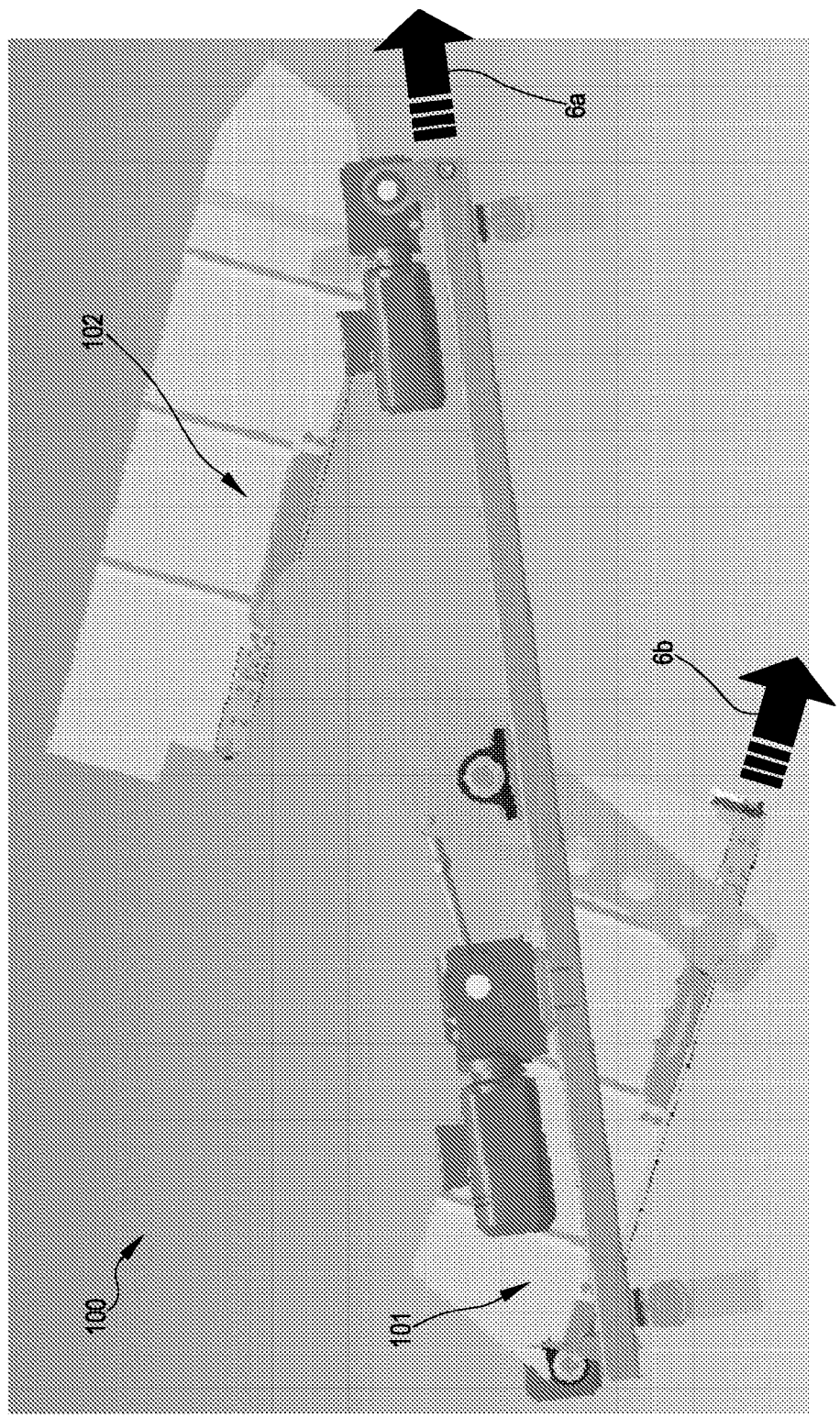
FIG. 29 shows the vertical switcher of FIG. 28.

In particular, the vertical switcher 100 is essentially illustrated in FIG. 29, constituted by two conveyor belts 101, 102 tilting around respective opposite axes such as to define an aligned condition (generally the normal passage of the articles—FIG. 28 and direction 6*a* in FIG. 29) and an open configuration (FIG. 29—direction 6*b*) in which the respective ends, usually in proximity, of the first and second belts 101, 102 are vertically distanced and switch the flow of products. The above sequence enables commanding by activation, for example, by the control unit 22, the opening/closing of the vertical switcher 100 and therefore the normal functioning or unloading of the products towards the unloading zone.

The above-described and illustrated embodiments achieve significant advantages.

Primarily, the singulator presented in its various embodiments is compact and involves modest costs.

The singulating operations are obtained with a first part (converger module and diverger module) substantially mechanically active on the various articles in order to bring them from a condition of loose order into a condition in which the articles are arranged on only three advancement lines (a main line and two secondary lines).

The electronic control part is minimized thus increasing operational reliability, but at the same time ensuring a high level of flexibility, being able to manage a fine level of singulation at the selector module 17.

The plan dimensions of the whole device, in both longitudinal and transversal directions, are rather modest while guaranteeing the ability to treat a rather high number of articles to be singulated per unit of time.

The invention claimed is:

1. A singulator, comprising:
   at least a converger module developing between an inlet station and an outlet station, the converger module being configured such as to receive loose articles at the inlet station and to move the articles towards the outlet station along a main advancement direction, the converger module exhibiting at least a first zone defined between the inlet station and the outlet station along the main advancement direction and configured such as alternatively to impart on the articles resting thereon an advancement motion along the main advancement direction or an advancement motion along the main advancement direction and a lateral movement in a direction of an adjacent second zone of the converger module, the second zone flanked to the first zone of the converger module along the main advancement direction and developing between the inlet and the outlet station, the second zone of the converger module being configured such as to impart on the articles resting thereon an advancement motion along the main direction and a lateral movement in a direction of the first zone of the converger module;
   at least a diverger module located downstream of the converger module along the main advancement direction developing between a respective inlet station and an outlet station, the diverger module exhibiting:
   a first zone configured such as to receive articles in arrival from the first zone of the converger module and such as to impart on the articles resting thereon an advancement motion along the main advancement direction;
   a second zone flanked to the first zone of the diverger module along the advancement direction and developing between the inlet station and the outlet station, said second zone of the diverger module being configured such as to impart on the articles resting thereon an advancement motion along the main direction and a lateral movement in a distancing direction from the first zone of the diverger module;
   at least a third zone, flanking the second zone of the diverger module along the main advancement direction on the opposite side with respect to the first zone of the diverger module and developing from an initial position comprised between the inlet station and a halfway zone up to the outlet station, the articles at said third zone of the diverger module being moved along the advancement direction up to the outlet station;
   a fourth zone developing between an inlet station and an outlet station and flanked to the first zone of the diverger module along the main advancement direction on an opposite side to the second zone of the diverger module, the fourth zone of the diverger module being configured such as to impart on the articles resting thereon an advancement motion along the main advancement direction and a lateral movement in a distancing direction from the first zone of the diverger module, the lateral movement imparted by the second zone of the diverger module and the fourth zone of the diverger module having a same direction and opposite senses directed respectively in a distancing direction from the first zone of the diverger module;
   a fifth zone flanking the fourth zone of the diverger module along the main advancement direction on an opposite side to the first zone of the diverger module, the articles at said fifth zone of the diverger module being moved along the advancement direction up to the outlet station, and
   wherein said first zone of the diverger module comprises a movement organ, a coefficient of friction between the first zone of the diverger module and the articles resting thereon being greater than a coefficient of friction between the second zone of the diverger module and the articles resting thereon and being greater than a coefficient of friction between the fourth zone and the articles resting thereon.

2. The singulator of claim 1, wherein the converger module comprises a third zone flanked to the first zone of the converger module along the main advancement direction on an opposite side to the second zone of the converger module and developing between the inlet station and the outlet station, the third zone of the converger module being configured such as to impart, on the articles resting thereon, an advancement motion along the main direction and a lateral movement in the direction of the first zone of the converger module, the lateral movement, from the third zone of the converger module and the second zone of the converger module towards the first zone of the converger module having a same direction and an opposite sense respectively directed towards the first zone of the converger module.

3. The singulator of claim 1, further comprising:
   at least a selector module located downstream of the diverger module along the main advancement direction and developing between a respective inlet station and an outlet station, the selector module exhibiting a first zone configured such as to receive the articles moved by at least the first zone of the diverger module such as to impart, on the articles resting thereon, an advancement motion along the main advancement direction from the inlet station to the outlet station and exhibiting a second zone of the diverger module configured such as to receive the articles moved by the third zone of the diverger module and such as to impart on the articles resting thereon an advancement motion along the main advancement direction from the inlet station to the outlet station;
   a control unit active at least on the first zone of the selector module such as to impart an advancement motion along the main advancement direction with a first profile of velocity and active on at least the second zone of the selector module such as to impart an advancement motion along the main advancement direction with a second profile of velocity which is independent of the first profile of velocity.

4. The singulator of claim 3, wherein the selector module comprises a third zone configured such as to receive the articles moved by the fifth zone of the diverger module and to impart on the objects resting thereon an advancement motion along the main advancement direction from the inlet station to the outlet station, the control unit being active on the third zone of the selector module such as to impart an advancement motion along the main advancement direction with a third profile of velocity independent of the first profile of velocity and/or the second profile of velocity.

5. The singulator of claim 3, comprising a detector system connected to the control unit such as to detect, over time, passage of articles in inlet to the selector module at least at the first zone of the selector module and the second zone of the selector module, and also at the third zone of the selector module, the control unit determining the profiles of velocity of the respective first zone, second zone, and third zone of the selector module according to detected data received by the detector system, the profiles of velocity being set such as to obtain outlet of the articles from the outlet station in a separated and not overlapping configuration along a transversal development of the selector module.

6. The singulator of claim 3, wherein the selector module comprises a fourth zone flanked to and interposed between the first zone of the selector module and the second zone of the selector module in the main advancement direction and a fifth zone of the selector module flanked to and interposed between the first zone of the selector module and the third zone of the selector module along the main advancement direction, the fourth zone of the selector module and fifth zone of the selector module developing from the inlet station to the outlet station, the fourth zone of the selector module and fifth zone of the selector module comprising moved surfaces, a coefficient of friction between the moved surfaces and the articles resting thereon being lower than a coefficient of friction between the respective adjacent zones of the selector module and the articles resting thereon.

7. The singulator of claim 1, wherein said first zone of the converger module comprises a movement organ, a coefficient of friction between the movement organ of the first zone of the converger module and the articles resting thereon being greater than a coefficient of friction between the second zone of the converger module and the articles resting thereon and being greater than a coefficient of friction between the third zone of the converger module and the articles resting thereon.

8. The singulator of claim 1, wherein said first zone of the converger module comprises at least a movement organ, including a roller plane having rollers with an inclined axis with respect to the main advancement direction, configured such as to impart on the articles resting thereon an advancement motion along the main advancement direction and a lateral movement in a direction of the second zone of the converger module.

9. The singulator of claim 1, wherein said second zone of the converger module comprises a movement organ, including a roller plane exhibiting rollers having an inclined axis with respect to the main advancement direction, such as to impart the advancement motion towards the outlet station and the lateral movement towards the first zone of the converger module.

10. The singulator of claim 1, wherein the third zone of the converger module comprises a movement element, including a roller plane exhibiting rollers having an inclined axis with respect to the main advancement direction, such as to impart an advancement motion towards the outlet station and the lateral movement towards the first zone of the converger module.

11. The singulator of claim 1, wherein said second zone of the diverger module comprises a movement element, including a roller plane having rollers with an inclined axis with respect to the main advancement direction, configured such as to impart the advancement motion towards the outlet station and the lateral movement in a distancing direction from the first zone of the diverger module.

12. The singulator of claim 1, wherein the fourth zone of the diverger module comprises a movement element, including a roller plane having rollers with an inclined axis with respect to the main advancement direction, configured such as to impart the advancement motion towards the outlet station and the lateral movement in a distancing direction from the first zone of the diverger module.

13. The singulator of claim 1, wherein the third zone of the diverger module comprises a lateral wall emerging from a median plane of the second zone of the diverger module, said lateral wall being configured such as to restingly receive the articles pushed by the second zone of the diverger module in a distancing direction from the first zone of the diverger module, and being configured such as to enable movement along the main advancement direction towards the outlet station, the fifth zone of the diverger module comprising a lateral wall emerging from a median plane of the fourth zone of the diverger module, said lateral wall being configured such as to restingly receive the articles pushed by the fourth zone of the diverger module in a distancing direction from the first zone of the diverger module, and being configured such as to enable a movement along the main advancement direction towards the outlet station.

14. A singulator comprising:
a predetermined number of processing modules of articles developing between an inlet station and an outlet station and configured to receive loose articles at the inlet station and to process and move the articles towards the outlet station along a main advancement direction, the predetermined number of processing modules of articles being configured to bring the articles in outlet from the outlet station according to at least a first and a second predetermined advancement lines;
a selector module located downstream of the predetermined number of modules along the main advancement direction and developing between a respective inlet station and an outlet station, the selector module exhibiting a first zone configured such as to receive the articles arriving from the first advancement line and for imparting on the articles resting thereon an advancement motion along the main advancement direction from the inlet station to the outlet station and exhibiting a second zone configured such as to receive the articles coming from the second advancement line and for imparting on the articles resting thereon an advancement motion along the main advancement direction from the inlet station to the outlet station, each of said first and second zones comprising a respective transport device; and
wherein at least one of said respective transport devices exhibits at least a first transport surface developing between the inlet station and the outlet station and a second transport surface developing between the inlet station and the outlet station and positioned adjacent to the first transport surface, said first transport surface creating a coefficient of friction with the articles resting thereon that is greater than a coefficient of friction between the second transport surface and the articles resting thereon.

15. A singulator, comprising:

at least a converger module developing between an inlet station and an outlet station, the converger module being configured to receive loose articles at the inlet station and to move the articles toward the outlet station along a main advancement direction, the converger module exhibiting at least a first zone defined between the inlet station and the outlet station along the main advancement direction and configured to alternatively impart on the articles resting thereon an advancement motion along the main advancement direction or an advancement motion along the main advancement direction and a lateral movement in a direction of an adjacent second zone of the converger module, the second zone flanked to the first zone of the converger module along the main advancement direction and developing between the inlet and the outlet station, the second zone of the converger module being configured to impart on the articles resting thereon an advancement motion along the main direction and a lateral movement in a direction of the first zone of the converger module;

at least a diverger module located downstream of the converger module along the main advancement direction developing between a respective inlet station and an outlet station, the diverger module exhibiting:
  a first zone configured to receive articles arriving from the first zone of the converger module and to impart on the articles resting thereon an advancement motion along the main advancement direction;
  a second zone flanked to the first zone of the diverger module along the advancement direction and developing between the inlet station and the outlet station, said second zone of the diverger module being configured to impart on the articles resting thereon an advancement motion along the main direction and a lateral movement in a distancing direction from the first zone of the diverger module;
  at least a third zone, flanking the second zone of the diverger module along the main advancement direction on an opposite side with respect to the first zone of the diverger module and developing from an initial position comprised between the inlet station and a halfway zone up to the outlet station, the articles at said third zone of the diverger module being moved along the advancement direction up to the outlet station;
  a fourth zone developing between an inlet station and an outlet station and flanked to the first zone of the diverger module along the main advancement direction on an opposite side with respect to the second zone of the diverger module, the fourth zone of the diverger module being configured to impart on the articles resting thereon an advancement motion along the main advancement direction and a lateral movement in a distancing direction from the first zone of the diverger module, the lateral movement imparted by the second zone and the fourth zone of the diverger module and having a same direction and opposite senses respectively directed in a distancing direction from the first zone of the diverger module; and
  a fifth zone flanking the fourth zone of the diverger module along the main advancement direction on an opposite side to the first zone of the diverger module, the articles at said fifth zone of the diverger module being moved along the advancement direction up to the outlet station;

at least a selector module located downstream of the diverger module along the main advancement direction and developing between a respective inlet station and an outlet station, the selector module exhibiting a first zone configured to receive the articles moved by at least the first zone of the diverger module to impart, on the articles resting thereon, an advancement motion along the main advancement direction from the inlet station to the outlet station and having a second zone configured to receive the articles moved by the third zone of the diverger module such as to impart on the articles resting thereon an advancement motion along the main advancement direction from the inlet station to the outlet station; and a control unit active at least on the first zone of the selector module to impart an advancement motion along the main advancement direction with a first profile of velocity and active on at least the second zone of the selector module to impart an advancement motion along the main advancement direction with a second profile of velocity which is independent of the first profile of velocity, wherein the selector module further comprises a third zone configured to receive the articles moved by the fifth zone of the diverger module and to impart on the objects resting thereon an advancement motion along the main advancement direction from the inlet station to the outlet station, the control unit being active on the third zone of the selector module such as to impart an advancement motion along the main advancement direction with a third profile of velocity independent of the first profile of velocity and/or the second profile of velocity, and wherein the selector module comprises a fourth zone, flanked to and interposed between the first and the second zones of the selector module in the main advancement direction, and a fifth zone, flanked to and interposed between the first and the third zones of the selector module along the main advancement direction, the fourth and fifth zone of the selector module developing from the inlet station to the outlet station, each of the fourth and fifth zones of the selector module comprising moved surfaces creating a coefficient of friction between the moved surfaces and the articles resting thereon, which is lower than a coefficient of friction between the respective adjacent zones of the selector module and the articles resting thereon.

16. The singulator of claim 15, wherein the converger module comprises a third zone flanked to the first zone of the converger module along the main advancement direction on an opposite side to the second zone of the converger module and developing between the inlet station and the outlet station, the third zone of the converger module being configured to impart, on the articles resting thereon, an advancement motion along the main direction and a lateral movement in the direction of the first zone of the converger module, the lateral movement, from the third zone of the converger module and the second zone of the converger module towards the first zone of the converger module, having a same direction and an opposite sense respectively directed towards the first zone of the converger module.

17. The singulator of claim 15, further comprising a detector system connected to the control unit to detect, over time, passage of articles in inlet to the selector module at least at the first and the second zones of the selector module, and also at the third zone of the selector module, the control unit determining the profiles of velocity of the respective zones according to detected data received by the detector system, the profiles of velocity being set such as to obtain outlet of the articles from the outlet station in a separated and not overlapping configuration along a transversal development of the selector module.

18. The singulator of claim 15, wherein said first zone of the converger module comprises a movement organ, a coefficient of friction between the movement organ of the first zone of the converger module and the articles resting thereon being greater than a coefficient of friction between the second zone of the converger module and the articles resting thereon and being greater than a coefficient of friction between the third zone of the converger module and the articles resting thereon.

19. The singulator of claim 15, wherein said first zone of the diverger module comprises a movement organ, a coefficient of friction between the first zone of the diverger module and the articles resting thereon being greater than a coefficient of friction between the second zone of the diverger module and the articles resting thereon and being greater than a coefficient of friction between the fourth zone of the diverger module and the articles resting thereon.

20. A singulator, comprising:
at least a converger module developing between an inlet station and an outlet station, the converger module being configured to receive loose articles at the inlet station and to move the articles towards the outlet station along a main advancement direction, the converger module exhibiting at least a first zone defined between the inlet station and the outlet station along the main advancement direction and configured to alternatively impart on the articles resting thereon an advancement motion along the main advancement direction or an advancement motion along the main advancement direction and a lateral movement in a direction of an adjacent second zone of the converger module, the second zone of the converger module flanking the first zone of the converger module along the main advancement direction and developing between the inlet and the outlet station, the second zone of the converger module being configured to impart on the articles resting thereon an advancement motion along the main direction and a lateral movement in a direction of the first zone of the converger module; and
at least a diverger module located downstream of the converger module along the main advancement direction and developing between a respective inlet station and an outlet station, the diverger module comprising:
a first zone configured to receive articles from the first zone of the converger module and to impart on the articles resting thereon an advancement motion along the main advancement direction;
a second zone flanked to the first zone of the diverger module along the advancement direction and developing between the inlet station and the outlet station, said second zone of the diverger module being configured to impart on the articles resting thereon an advancement motion along the main direction and a lateral movement in a distancing direction from the first zone of the diverger module;
at least a third zone, flanking the second zone of the diverger module along the main advancement direction on the opposite side with respect to the first zone of the diverger module and developing from an initial position comprised between the inlet station and a halfway zone up to the outlet station, the articles resting on said third zone of the diverger module being moved along the advancement direction up to the outlet station;
a fourth zone developing between an inlet station and an outlet station and flanked to the first zone of the diverger module along the main advancement direction on an opposite side to the second zone of the diverger module, the fourth zone of the diverger module being configured to impart on the articles resting thereon an advancement motion along the main advancement direction and a lateral movement in a distancing direction from the first zone of the diverger module, the lateral movement imparted by the second zone and the fourth zone of the diverger module having a same direction and opposite senses directed respectively in a distancing direction from the first zone of the diverger module; and
a fifth zone flanking the fourth zone of the diverger module along the main advancement direction on an opposite side to the first zone of the diverger module, the articles resting on said fifth zone of the diverger module being moved along the advancement direction up to the outlet station,
wherein said first zone of the converger module comprises a movement organ, a coefficient of friction between the movement organ of the first zone of the converger module and the articles resting thereon being greater than a coefficient of friction between the second zone of the converger module and the articles resting thereon and being greater than a coefficient of friction between a third zone of the converger module and the articles resting thereon.

21. The singulator of claim 20, wherein the converger module comprises a third zone flanked to the first zone of the converger module along the main advancement direction on an opposite side to the second zone of the converger module and developing between the inlet station and the outlet station, the third zone of the converger module being configured to impart, on the articles resting thereon, an advancement motion along the main direction and a lateral movement in the direction of the first zone of the converger module, the lateral movement, from the third zone of the converger module and the second zone of the converger module towards the first zone of the converger module having a same direction and an opposite sense respectively directed towards the first zone of the converger module.

* * * * *